United States Patent
Furuya

(10) Patent No.: US 6,385,314 B1
(45) Date of Patent: May 7, 2002

(54) TRANSMISSION DEVICE CONTROL SYSTEM EQUIPPED WITH HIGH-EFFICIENCY CODING SCHEME IN COMMUNICATION NETWORK

(75) Inventor: Nobuo Furuya, Kawagoe (JP)

(73) Assignee: Kokusai Denshin Denwa Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/078,822

(22) Filed: May 14, 1998

(30) Foreign Application Priority Data

May 21, 1997 (JP) ............................. 9-146012

(51) Int. Cl.[7] .............................................. H04M 7/00
(52) U.S. Cl. .................................................... 379/219
(58) Field of Search ................................. 379/221, 229, 379/230, 346, 347

(56) References Cited

U.S. PATENT DOCUMENTS 5,724,406 A * 3/1998 Suster ..................... 379/201 X
5,724,417 A * 3/1998 Bartholomew et al. .. 379/201 X
5,727,058 A * 3/1998 Blumhardt et al. ...... 379/201 X
5,732,128 A * 3/1998 Bushnell ................. 379/201 X

* cited by examiner

Primary Examiner—Creighton Smith
(74) Attorney, Agent, or Firm—Lackenbach Siegel Marzullo Aronson & Greenspan, P.C.

(57) ABSTRACT

A control system for transmission devices equipped with a high-efficiency coding scheme in a communication network which avoids degradation of the quality of an acoustic signal for transmission and permits an efficient transfer of the acoustic signal. The control system has a structure in which: information on a high-efficiency coding scheme used in the preceding transmission device is sent to the current exchange from the preceding one through the use of an out-band signaling system for transmitting and receiving a call control signal via a channel different from a speech channel; and based on the information sent to the current exchange, second-placed transmission devices connected to the current and following exchanges avoid effectively decoding/coding of the acoustic signal transferred thereto, or the use of these transmission devices is avoided.

6 Claims, 17 Drawing Sheets

———————— TRANSMISSION LINE (T.L.)
━━━━━━━━ TRANSMISSION-SWITCHING T.L.
- - - - - - - - TRANSMISSION-SWITCHING
　　　　　　　　SIGNAL LINK
— — — — — SIGNAL LINK

———————— TRANSMISSION LINE

━━━━━━━━ TRANSMISSION-SWITCHING T.L.

- - - - - - - - TRANSMISSION-SWITCHING SIGNAL LINK

— — — — — SIGNAL LINK

TRANSMISSION DEVICE CONTROL SYSTEM EQUIPPED WITH HIGH-EFFICIENCY CODING SCHEME IN COMMUNICATION NETWORK

BACKGROUND OF THE INVENTION

The present invention relates to a control system for transmission devices equipped with a high-efficiency coding scheme in a communication network, including a telephone network•ISDN (Integrated Services Digital Network).

With the recent progress in high efficiency speech coding technologies, it is now possible to transfer a high-quality speech signal at low speeds; however, such a high-efficiency coding scheme has a defect of degradation of speech quality by repeated decoding/coding of the speech signal. As a solution to this problem, there has been proposed such a system as depicted in FIG. 15, which comprises exchanges 101a, 101b, 101c and 101d, transmission devices 102b, 102d and 102f equipped with a high-efficiency coding scheme and directly connected to input or incoming lines (channels from a calling party) of the exchanges, respectively, and transmission devices 102a, 102c and 102e similarly equipped with a high-efficiency coding scheme and directly connected to output or outgoing lines (channels to a called party) of the exchanges, respectively. In this system, specific information is transferred (as indicated by 10d, 10e, 10f, 10g, 10h and 10i) over speech paths between some of the exchanges and the transmission devices preceding or following them and between transmission devices preceding and following the other exchanges. The transmission devices 102b, 102c, 102d and 102e, which have received the specific information, do not decode/encode a speech signal encoded with high efficiency but only perform switching of the coding rate for matching it to the speed of circuit switching. On the other hand, the transmission devices 102a and 102f, which have not received the specific information, decode/encode the speech signals encoded with high efficiency. This avoids the necessity for decoding/coding in exchanges which involve relay processing, thereby suppressing degradation of speech quality.

However, when transmission devices of the same characteristic cannot be used over the entire communication channel as depicted in FIG. 16, decoding/coding is unavoidable in transmission devices 112a, 112b, 112c and 112d connected to exchanges 111a, 111b, 111c and 111d which involve relay processing; hence, speech quality is inevitably degraded.

Further, since this is not a communication system of the type that exchanges pass therebetween information concerning channel conditions, it is impossible to choose, if any, a transmission line over which communication could be done without degradation. Moreover, as shown in FIG. 17, since in some exchange (121c, for instance) no speech channel has been set up from a calling party to a called party until the latter answers the call, a transmission device 122d connected to the incoming path of the exchange 121c receives specific information which is transferred over the channel, and only performs converting of the coding rate of high-efficiency-coded speech signal for matching it with the speed of circuit switching in that exchange without decoding/coding of the speech signal. On the other hand, a transmission device 122e connected to the outgoing path of the exchange 121c decodes/encodes the high-efficiency-coded speech signal encoded without receiving specific information (12h) which is transferred over the channel. Hence, the coding/decoding at either side of the exchange 121c does not match with the coding/decoding at the other side thereof and this exchange cannot relay the speech signal, giving rise to a problem that it cannot transfer the speech signal or acoustic signal before the called party answers.

SUMMARY OF THE INVENTION

It is an object of the present invention to provide a control system for transmission devices equipped with a high-efficiency coding scheme in a communication network which avoids degradation of the quality of an acoustic signal being transferred and permits its efficient transfer.

To attain the above object, the control system for transmission devices equipped with a high-efficiency coding function in a communication network according to the present invention has a structure in which information on a high-efficiency coding scheme used in the preceding transmission device is sent from the preceding exchange to the current and following exchanges through the use of an out-band signaling system, and based on this information, it is determined whether to prevent the transmission devices connected to the current and following exchanges from decoding/coding of the transferred acoustic signal by the high-efficiency coding function for the transfer of the signal or avoid the use of these transmission devices.

That is, according to the present invention, there is provided a control system for transmission devices each equipped with a high-efficiency coding scheme in a communication network in which a first transmission line through each of the transmission devices provided with a coding/decoding circuit for high-efficiency coding/decoding scheme of an acoustic signal and a second transmission line not through said each transmission device are connected to one of a predetermined number of exchanges, characterized in: that, in case of starting a transfer of a high-efficiency-coded acoustic signal from one of the predetermined number of exchanges, the type of high-efficiency coding scheme to be used and an identifier, which indicates that the acoustic signal has been coded or decoded by said high-efficiency coding scheme, are sent as processing information on the coded acoustic signal which is transferred from the transfer-starting exchange to the following exchange in the communication network, the processing information being contained in a call control signal indicative of the start of a call; and that each of the exchanges in the communication network, through which the coded acoustic signal passes in its transfer, uses the processing information transferred thereto to select the first transmission line or the second transmission line as an outgoing line so as to avoid degradation of the quality of the acoustic signal due to its multi-stage coding and decoding for the high-efficiency coding scheme and to efficiently transfer the acoustic signal.

The transfer starting exchange is provided with a call controller for effecting a call control operation by a processing function of an out-band signaling system and a switching part for circuit switching, the call controller of the exchange being connected to the transmission device via a transmission switching signal link.

The transmission device is provided with a coding/decoding controller, which, based on the processing information, controls whether to enable the high-efficiency coding/decoding of the acoustic signal or disable the high-efficiency coding/decoding in the transmission device, and a coding rate converter for converting the coding rate of the coded acoustic signal, the coding/decoding controller of the transmission device being connected to a call controller of the exchange via a transmission switching signal link.

The processing information is analyzed in the call controller of the exchange, and when the transfer of an acoustic signal coded with the same high-efficiency coding scheme as the said high-efficiency coding scheme of said first transmission line preceding said exchange is possible over the first transmission line immediately following the exchange, the exchange selects as an outgoing line the first transmission line through the transmission device and provides an instruction via the transmission switching signal link to the coding/decoding controller of each of the transmission devices preceding and following the exchange connected thereto so that the exchange permits the passage therethrough of the coded acoustic signal intact without coding or decoding the same, and provides onto the immediately following first transmission line a signal obtained by converting the coding rate of the coded acoustic signal in the coding rate converter.

The processing information is analyzed in the call controller of the exchange, and when the transfer of an acoustic signal coded with the same high-efficiency coding scheme as the said high-efficiency coding scheme of said first transmission line preceding said exchange is impossible over the first transmission line immediately following the exchange, the exchange selects as an outgoing line the second transmission line not through the transmission device and provides an instruction via the transmission switching signal link to the coding/decoding controller of the transmission device preceding the exchange so that the transmission device decodes the coded acoustic signal, and provides onto the immediately following second transmission line the signal decoded to an acoustic signal of non high-efficiency coding scheme.

The processing information is analyzed in the call controller of the exchange, and when it is judged that the transfer of an acoustic signal coded with a second high-efficiency coding scheme different from the said high-efficiency coding scheme is possible over the first transmission line immediately following the exchange, and that degradation of the quality of the coded acoustic signal will be avoided in the course of its coding by the second high-efficiency coding scheme, the exchange: selects as an outgoing line the first transmission line through the transmission device: provides an instruction via the transmission switching signal link to the coding/decoding controller of the transmission device preceding the exchange so that the transmission device decodes the coded acoustic signal: provides an instruction via the transmission switching signal link to the decoding/coding controller of the transmission device following the exchange so that the transmission device encodes the acoustic signal by the second high-efficiency coding scheme; and transfers to the immediately following first transmission line a signal obtained by the second high-efficiency coding scheme.

BRIEF DESCRIPTION OF THE DRAWINGS

The present invention will be described in detail below with reference to the accompanying drawings, in which.

DETAILED DESCRIPTION OF THE INVENTION

Figure 1:
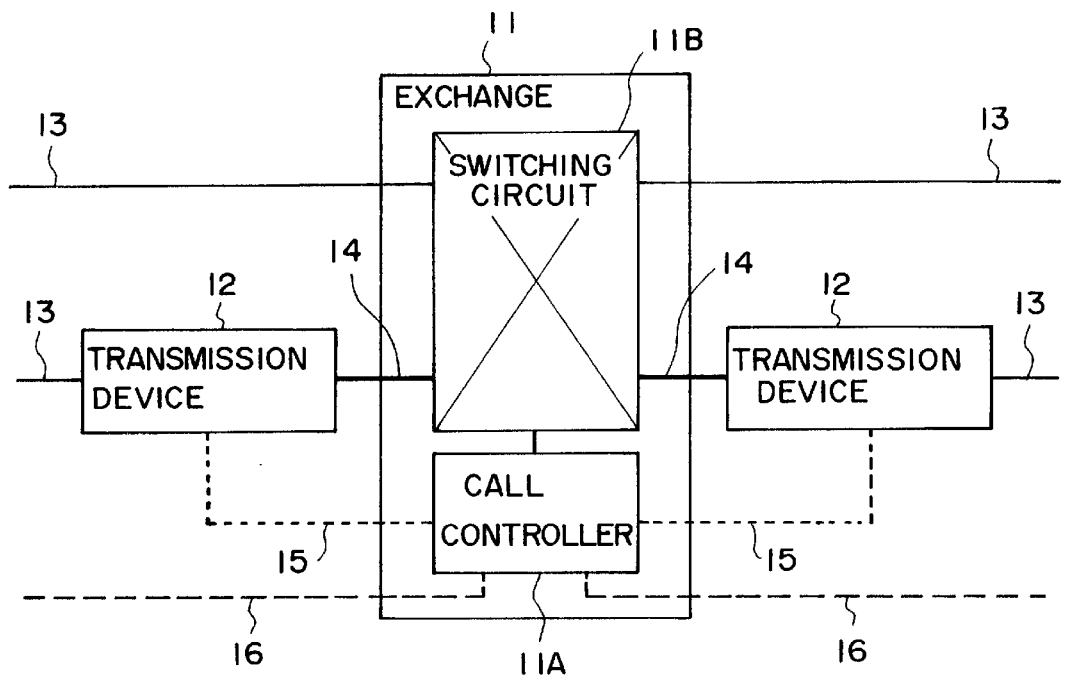
FIG. 1 is a block diagram illustrating an example of the structure of the first invention of this application.
Figure 2:
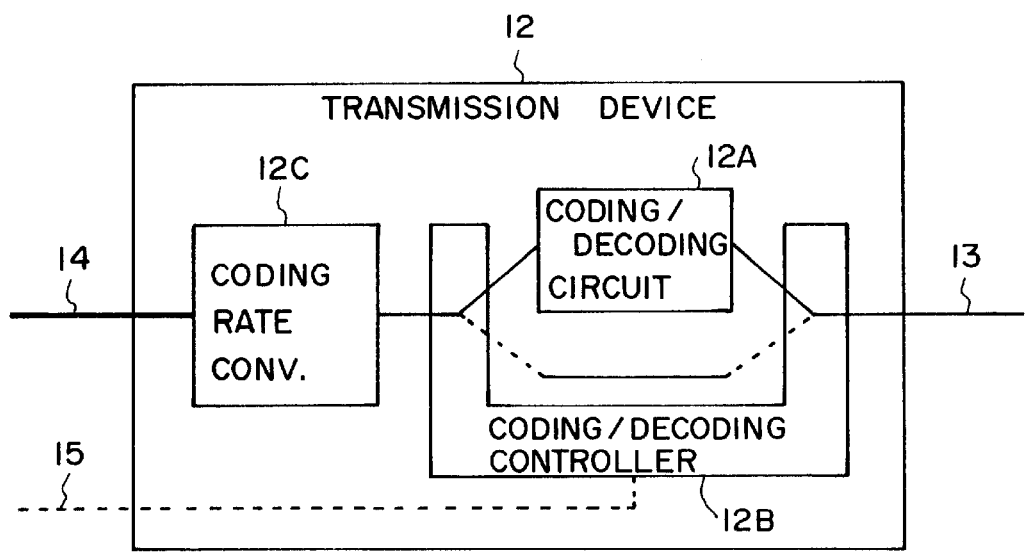
FIG. 2 is a block diagram illustrating an example of a transmission device for use in the example of FIG. 1.

FIGS. 1, 2 and FIGS. 3, 4 are block diagrams explanatory of the principles of a first invention of this application. In FIGS. 1 and 2 there is depicted the principal part of the present invention. As shown in FIG. 1, according to the first invention of this application, an exchange 11 is made up of a call controller 11A which has a processing function of the out-band signaling system and effects call control and a switching circuit 11B which performs circuit switching; the exchange is connected to transmission devices 12, each having a coding/decoding part 12A which performs high-efficiency coding/decoding of an acoustic signal such as a speech signal, via transmission-switching transmission lines 14 over which the above-mentioned acoustic signal is transferred. Thus, a transmission line 13 (a first transmission line) passing through the transmission device 12 and a transmission line (a second transmission line) 13 which bypasses it are connected to the exchange 11. A transmission switching signal link 15 is connected between the call controller 11A and a coding/decoding controller 12B of each transmission device, and a signal link 16 of the out-band signaling system is connected to the call controller 11A.

Figure 3:
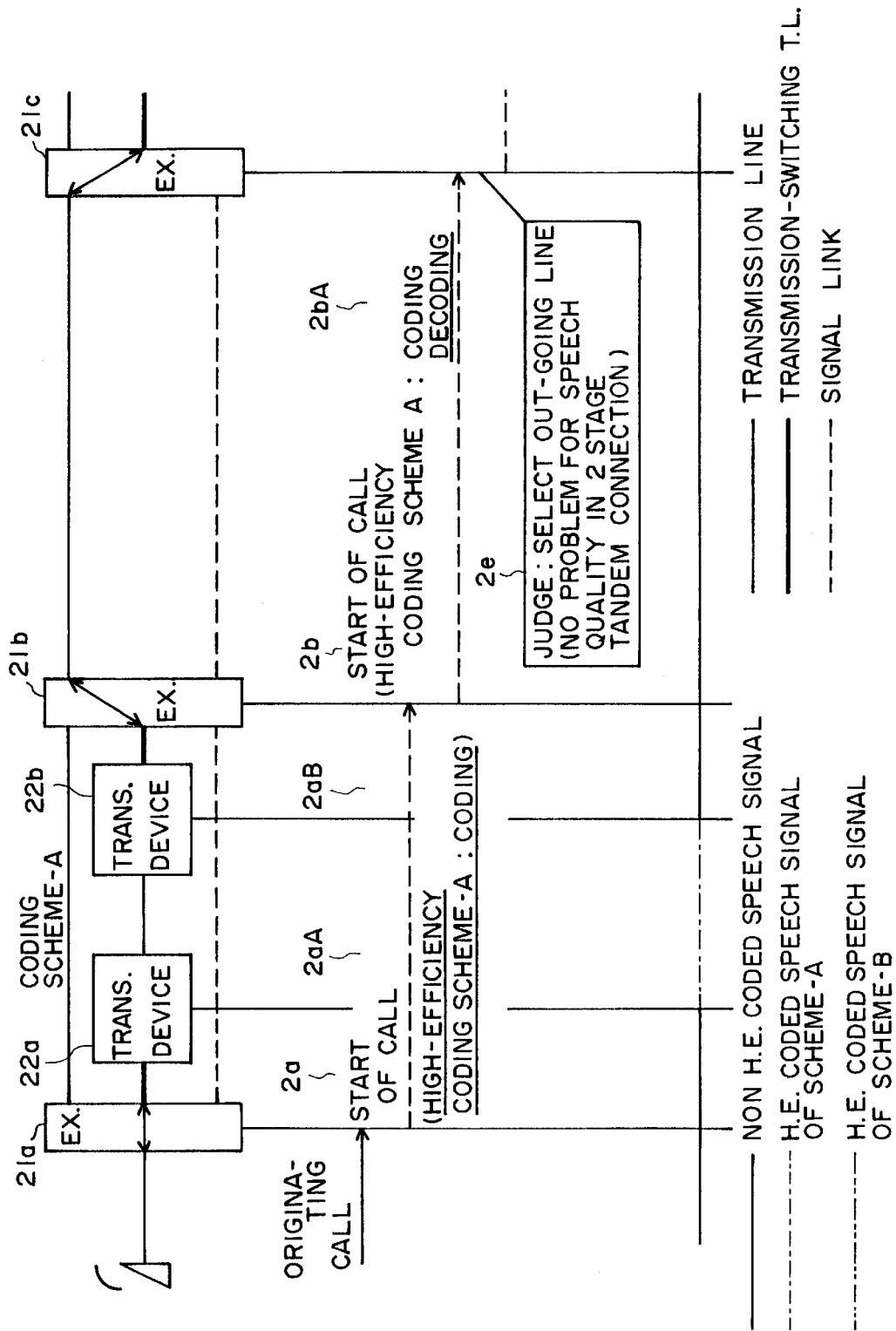
FIG. 3 is a block diagram depicting an example of a transmission system according to the first invention of this application.
Figure 4:
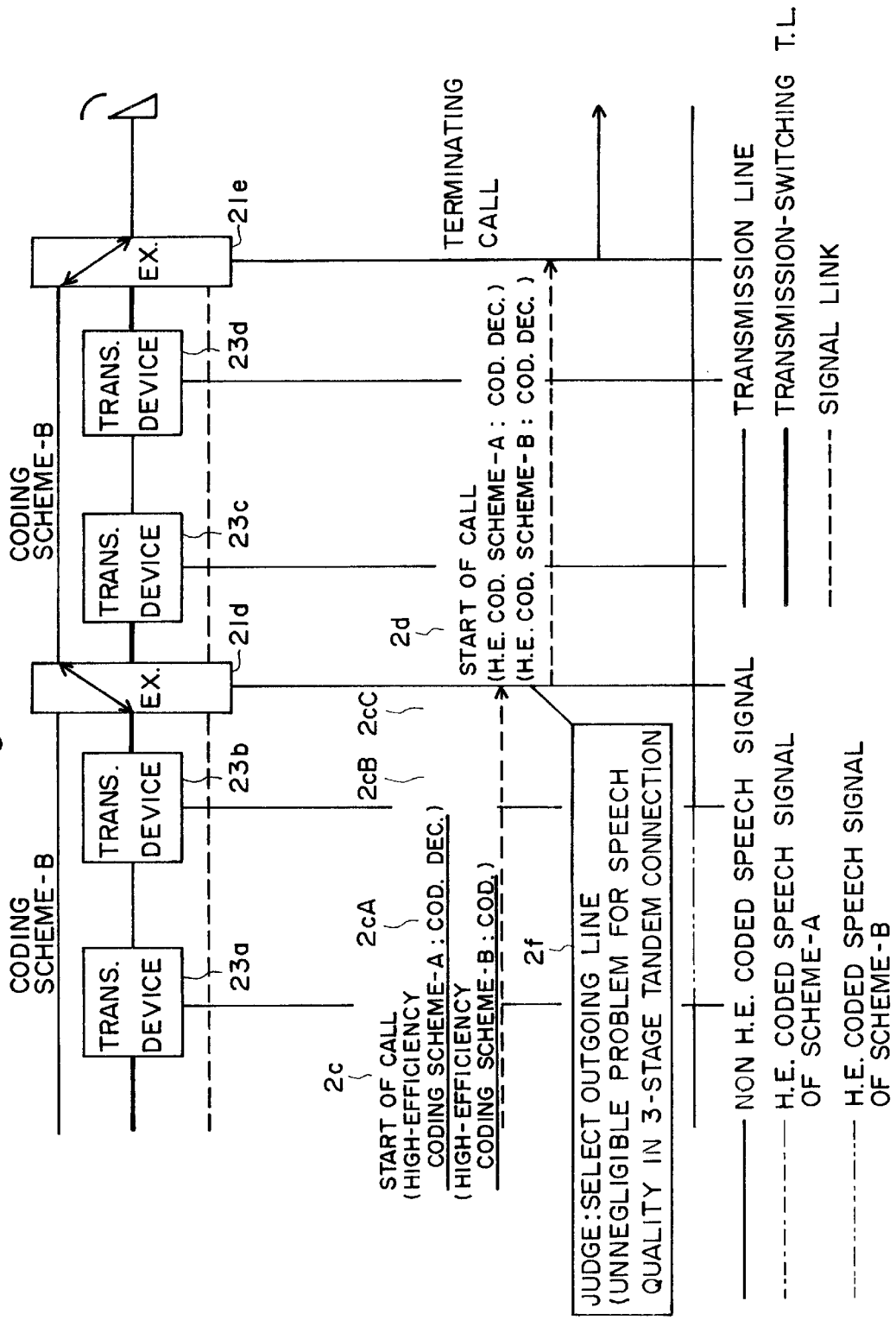
FIG. 4 is a block diagram depicting another example of a transmission system according to the first invention of this application.

FIGS. 3 and 4 show, in combination, the first invention of this application. When the transfer of a speech signal (an example of the afore-mentioned acoustic signal) coded with a high efficiency coding scheme is started via a transmission device 22a equipped with the high-efficiency coding scheme, an exchange or similar device 21a which starts the transfer sends, together with a call control signal 2a indicating the start of the call, the type 2aA of the high-efficiency coding scheme used and an identifier 2aB indicating that the speech signal has been coded, as information which is sent to a last-stage exchange or similar device 21e having the processing function of a continuous out-band signaling system.

When the transferred speech signal coded with a high efficiency coding scheme is decoded into a non-high-efficiency coded speech signal, an exchange or similar device 21b which instructs the decoding sends an identifier 2bA indicating that the speech signal has been decoded, as information which is sent to the last-stage exchange or similar device 21e, together with a control signal 2b indicative of the start of the call in addition to the coding process information about the speech signal.

Further, in case of performing high-efficiency coding identical with or different from that done in the preceding exchange, an exchange 21C similarly sends the type 2cA of high-efficiency coding scheme used and an identifier 2cB indicating that the speech signal has been coded/decoded, as information which is sent to the last-stage exchange or similar device 21e, together with a call control signal 2c indicative of the start of the call in addition to coding process information 2cC about the speech signal. Exchanges 21c and 21d, through which the above-mentioned information passes, each respond to the speech coding process information to select (as indicated by 2e, 2f), as an output or outgoing line, a transmission line which passes through the transmission device having the high-efficiency coding scheme or does not pass through the same, so as to avoid degradation of the transmission quality by multi-stage coding/decoding of the high-efficiency-coded speech signal and hence achieve its efficient transfer.

FIGS. 1, 2, 3, 4, 5, 6, 7 and 8 are diagrams explanatory of the principles of a second invention of this application. In FIGS. 1 and 2, the transmission device 12 is provided with a coding/decoding controller 12B which responds to external control information to control whether to perform coding/decoding of the speech signal or pass it intact through the transmission device, and a coding rate converter 12C which converts the coding rate of the speech signal from or to an exchange. Provided between the coding/decoding controller 12B of the transmission device 12 and the call controller 11A of the exchange is a transmission switching signal link 15 over which control information of the transmission device is transferred.

Figure 5:
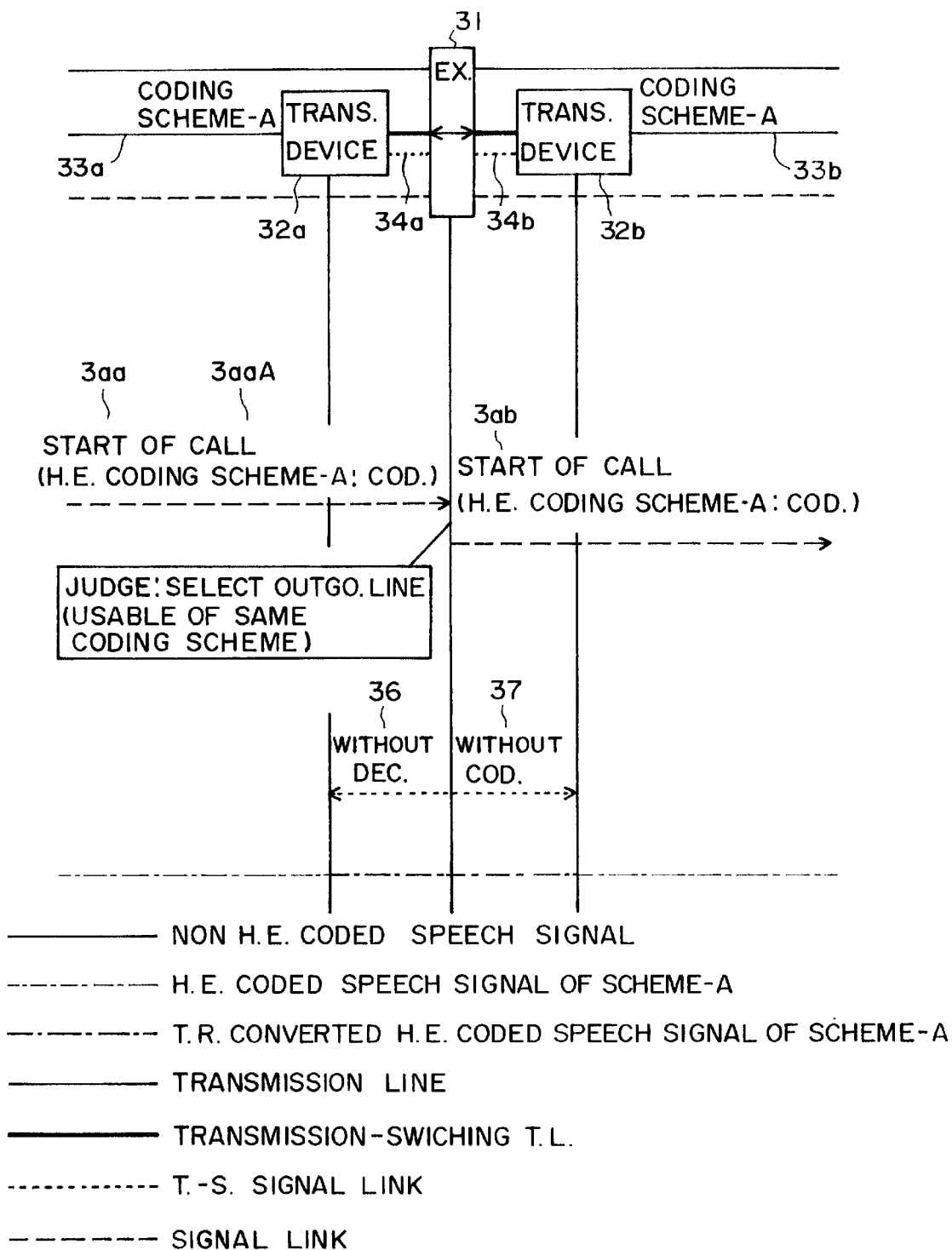
FIG. 5 is a block diagram illustrating the principal part of an example according to the second invention of this application.

FIG. 5 is explanatory of the operation of the control system in a case where a call control signal 3aa indicative of the start of a call is analyzed in an exchange 31, a high-efficiency-coded speech signal is transferred over a transmission line 33a immediately preceding it, and the transfer of speech coded by the same high-efficiency coding scheme as that for the above-mentioned speech signal is possible over the immediately subsequent transmission line 33b. In this instance, the exchange 31 selects the transmission line 33b passing through a transmission device 32b, as an outgoing line, and provides instructions 36 and 37 via transmission switching signal links 34a and 34b to the coding/decoding controllers (12B) of the preceding and subsequent transmission devices 32a and 32b so that they permit the passage therethrough of the speech signal without performing its decoding/coding. Further, the exchange 31 controls the coding rate converter (12C) of each transmission device to switch the coding rate of the speech signal to match it to the signal transmission rate of the exchange, and sends a signal 3ab to the subsequent exchange without adding any coding-process information 3aaA contained in the call control signal 3aa.

Figure 6:
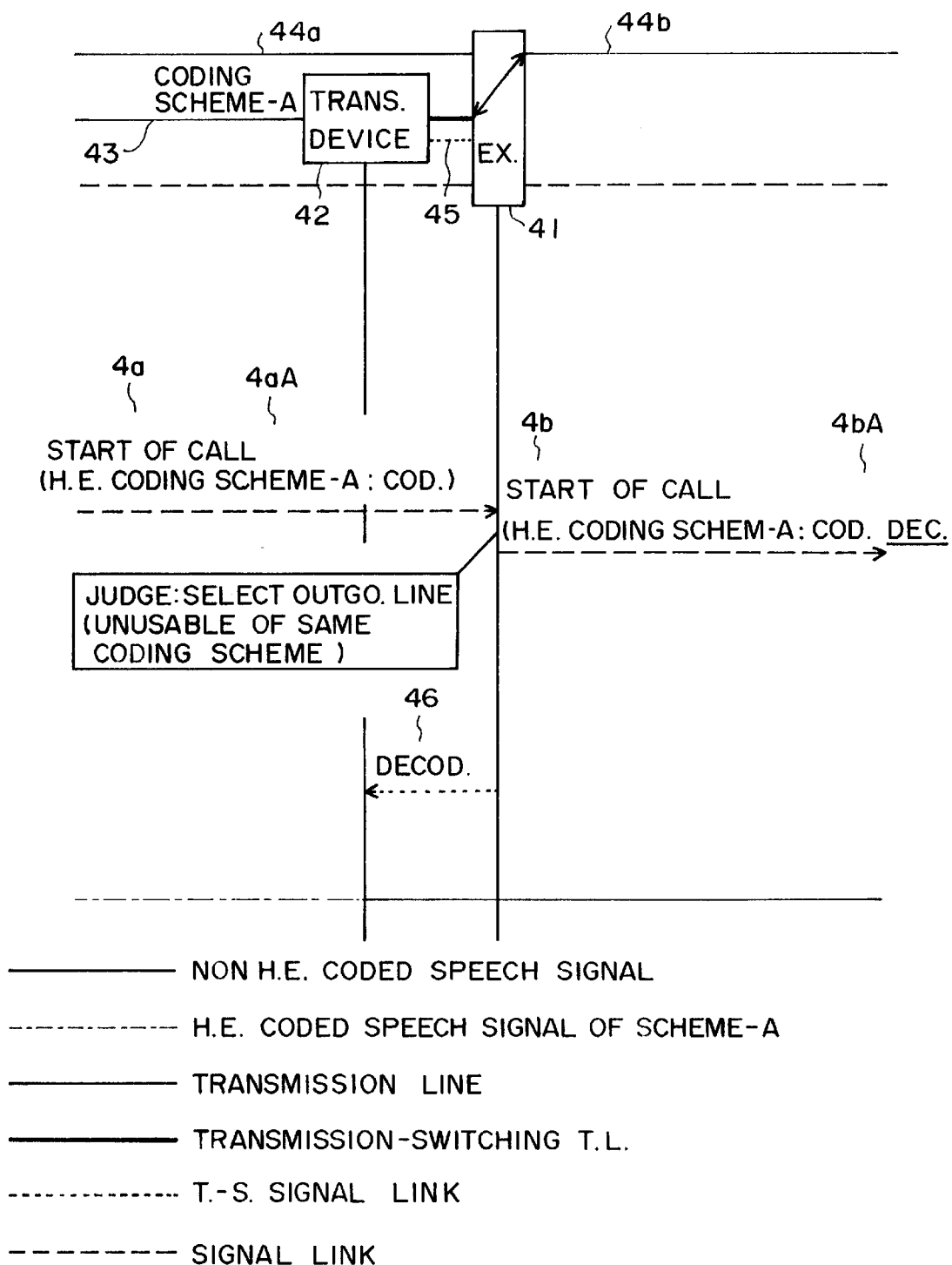
FIG. 6 is a block diagram illustrating the principal part of another example according to the second invention of this application.

FIG. 6 is explanatory of the operation of the control system in a case where a call control signal 4a indicative of the start of a call is analyzed in an exchange 41, and a high-efficiency-coded speech signal is transferred over a transmission line 43 immediately preceding it. If the transfer of a speech signal coded with the same high-efficiency coding scheme as that for the above-mentioned speech signal is impossible over the immediately subsequent transmission line 44b, the exchange 41 provides a decoding instruction 46 via a transmission switching signal link 45 to the coding/decoding controller (12B) of the preceding transmission devices 42, and transfers to an outgoing line the speech signal decoded to non-high-efficiency-coded form. Further, the exchange 41 selects, as the outgoing line, the transmission line 44b which bypasses a transmission device, adds a decoding identifier 4bA about the previous coding system to coding-process information 4aA contained in the call control signal 4a, and sends the combined signal 4b to a next exchange.

Figure 7:
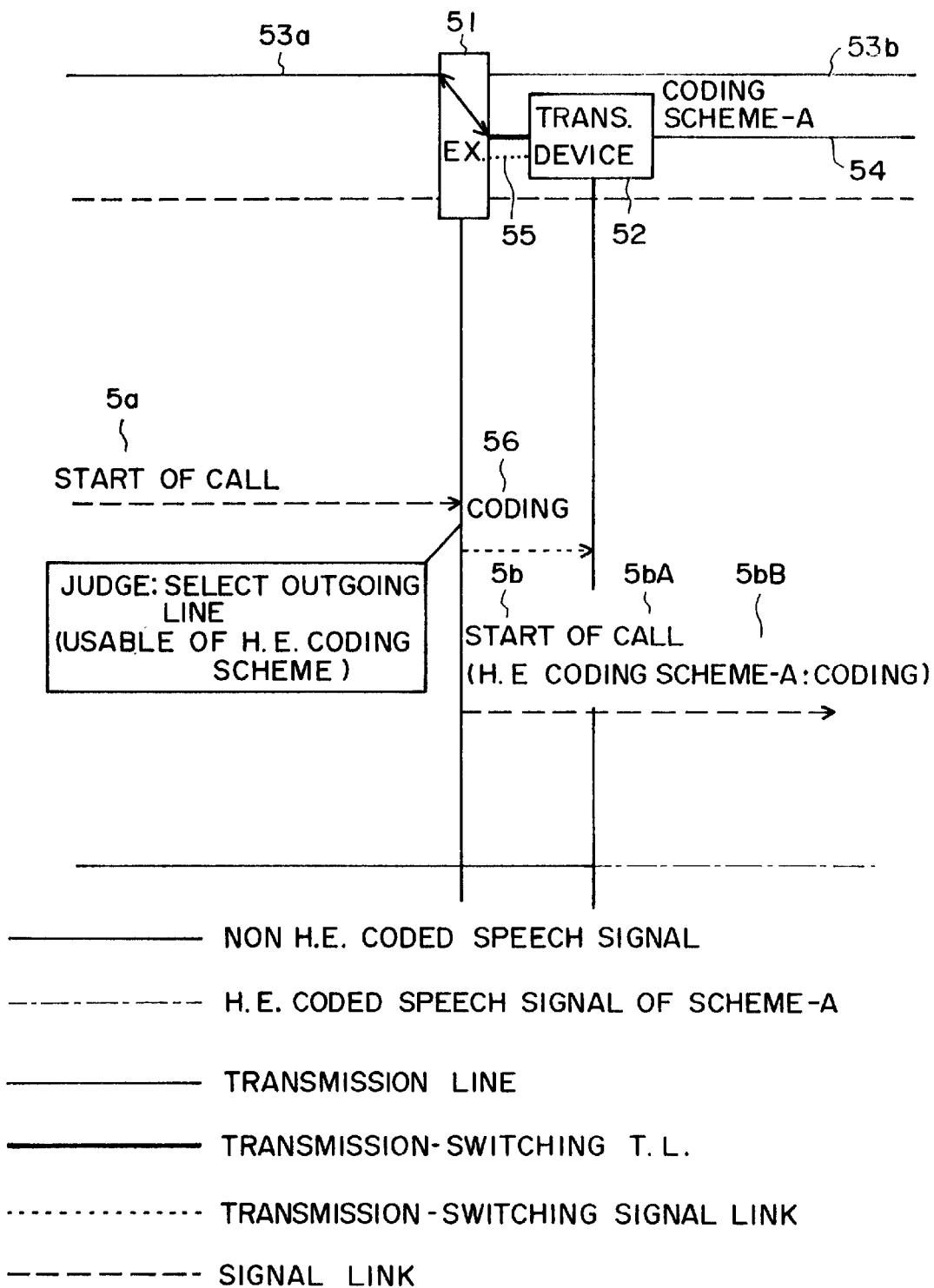
FIG. 7 is a block diagram illustrating the principal part of another example according to the second invention of this application.

FIG. 7 is explanatory of the operation of the control system in a case where a call control signal 5a indicative of the start of a call is analyzed in an exchange 51, a non-high-efficiency-coded speech signal is transferred over an immediately preceding transmission line 53a, and a high-efficiency-coded speech signal is transferred over an immediately subsequent transmission line 54. In this instance, the exchange 51 selects, as an outgoing line, the transmission line 54 which passes through a transmission device 52, and provides a high-efficiency coding instruction 56 via a transmission-switching signal link 55 to the coding/decoding controller (12B) of the next transmission device 52.

Further, the above-mentioned exchange 51 adds information 5bA indicative of the type of a high-efficiency coding scheme to be used next and a encoding identifier 5aB indicating that the speech signal has been coded, to coding-process information 5bB contained in the call control signal 5a, and sends the combined signal 5b to a next exchange.

Figure 8:
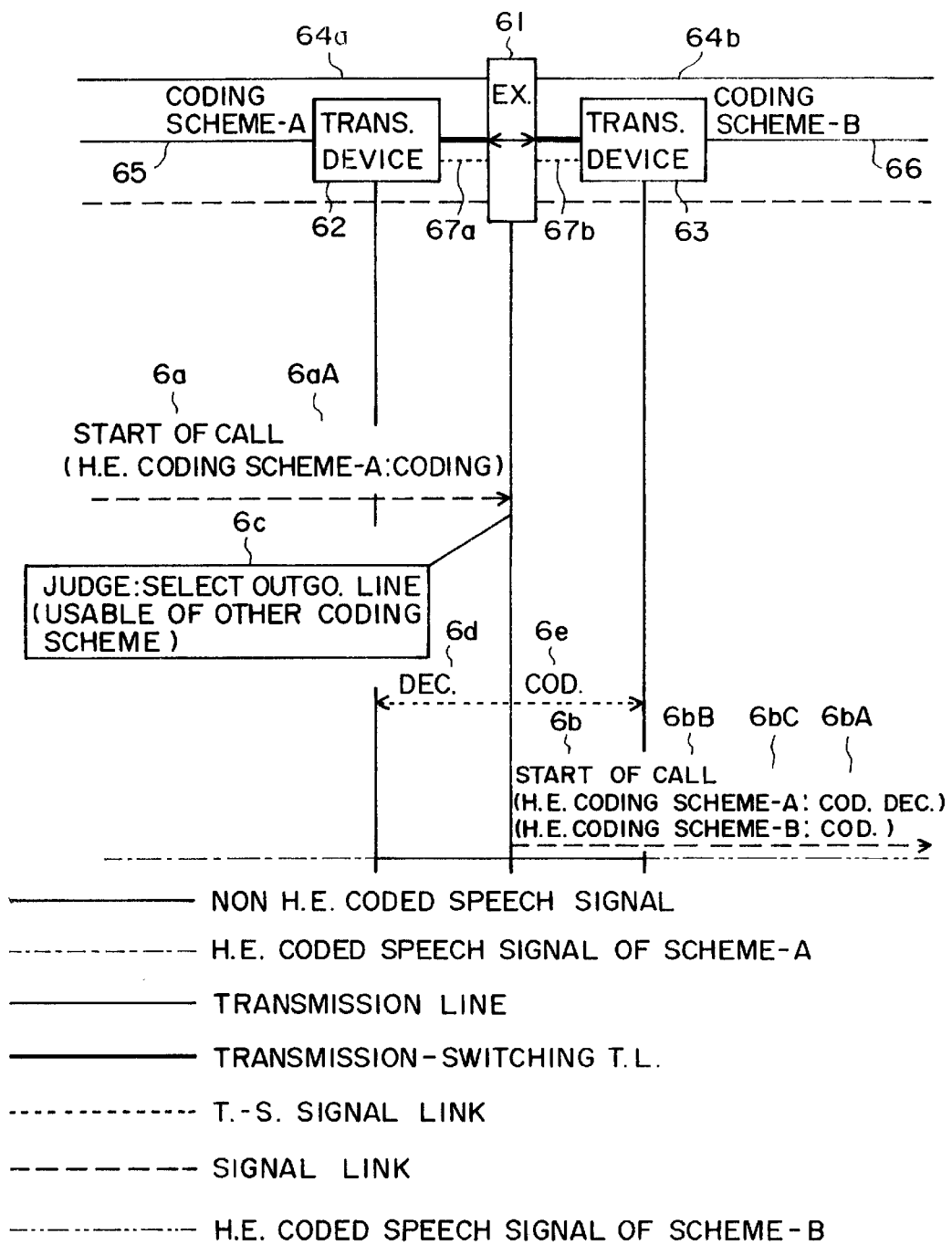
FIG. 8 is a block diagram illustrating the principal part of still another example according to the second invention of this application.

FIG. 8 is explanatory of the operation of the control system in the case where: a call control signal 6a indicative of the start of a call is analyzed in an exchange 61; a high-efficiency-coded speech signal is transferred over an immediately preceding transmission line 65; a speech signal coded by a different high-efficiency coding scheme is transferred over the immediately following transmission line 66;

and it is judged (6c) that the speech quality would not be degraded even if the speech signal is decoded or encoded to a non-high-efficiency-coded form because of a change of the coding scheme. In this instance, the exchange 61 provides a decoding instruction (6d) via a transmission-switching signal link 67a to the coding/decoding controller (12B) of the preceding transmission device 62, then transfers to an outgoing line the speech signal decoded to non-high-efficiency-coded form, then selects (6c) as the outgoing line a transmission line 66 passing through a transmission device 63, and provides a high-efficiency-coding instruction (6e) via a transmission-switching signal link 67b to the coding/decoding controller (12B) of the subsequent transmission device 63. Further, the above-mentioned exchange adds, to coding-process information 6aA contained in the call control signal 6a, a decoding identifier 6bA on the previous coding system, information 6bB on the kind of high-efficiency coding system for the subsequent coding system and an identifier 6bC indicating that the speech signal has been coded, and the exchange sends the combined signal 6b to the subsequent exchange, thereby avoiding degradation of the speech quality due to multi-stage coding/decoding of the high-efficiency-coded speech signal and hence ensuring an efficient transfer of the speech signal.

[Embodiments]

With reference to the drawings, embodiments of the present invention will hereinbelow be described.

Figure 9:
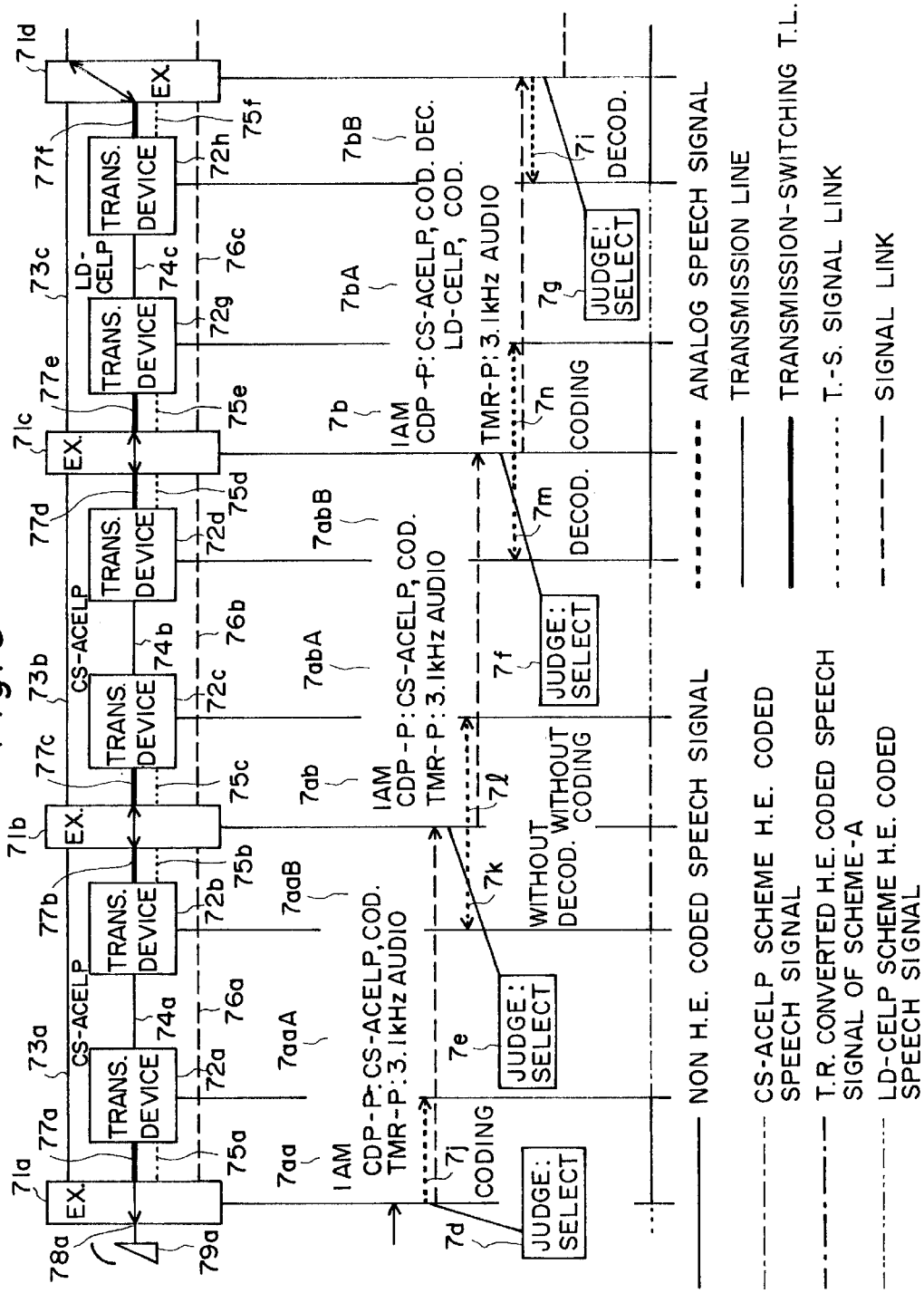
FIG. 9 is a block diagram illustrating an embodiment of the present invention which uses, as an out-band signaling system between exchanges, No. 7 signaling system ISDN user part defined in ITU-T Recommendations Q.763 and Q.764.
Figure 10:
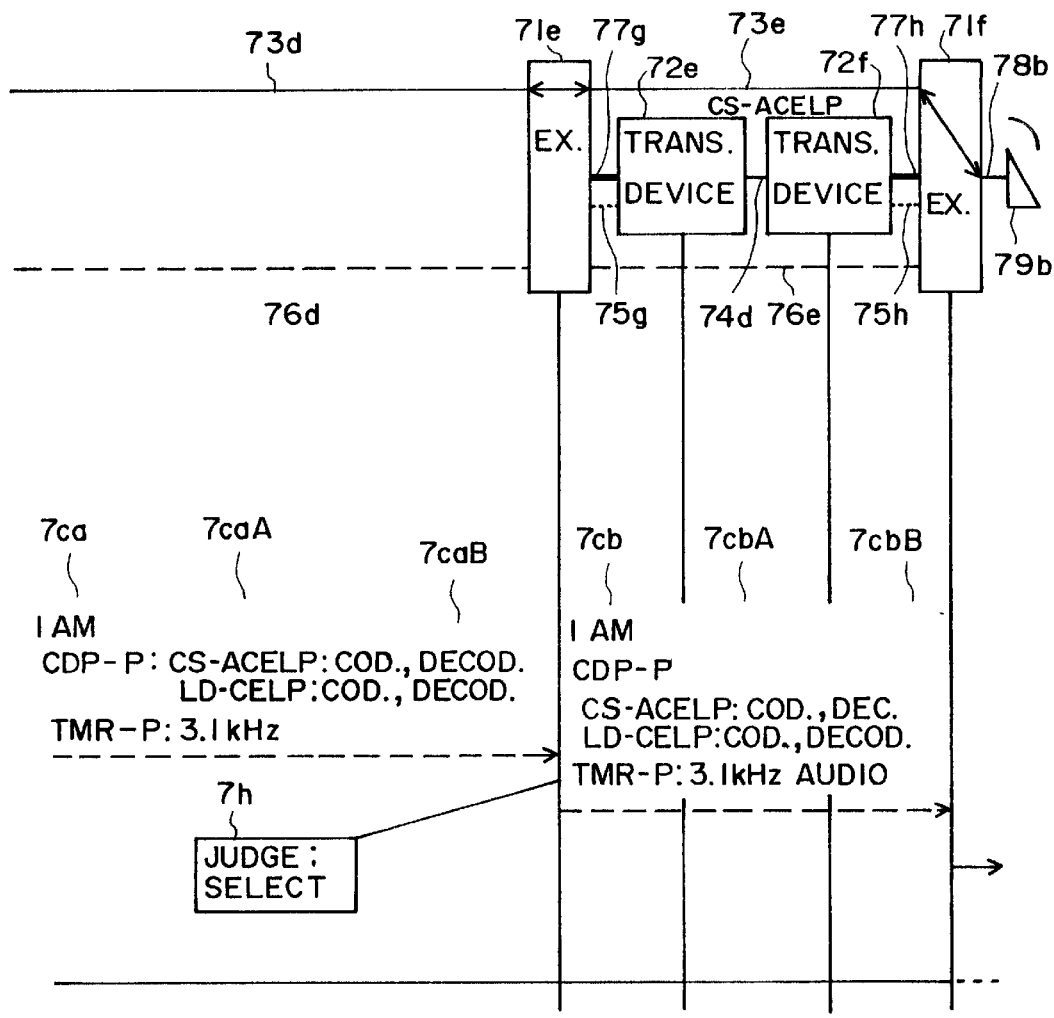
FIG. 10 is a block diagram illustrating, in combination with FIG. 9, the embodiment of the present invention which uses, as the out-band signaling system between exchanges, the No. 7 signaling system ISDN user part defined in ITU-T Recommendations Q.763 and Q.764.

FIGS. 9 and 10 are diagrams depicting, in two parts, an example which uses, as an out-band signaling system between exchanges, No. 7 signaling system ISDN user part (hereinafter referred to as "N7ISUP") defined in ITU-T Recommendations Q.763 and Q.764. Originating and terminating telephone terminals 79a and 79b are connected to originating and terminating exchanges 71a and 71f via analog subscriber lines 78a and 78b, respectively. Interposed between exchanges 71a–71b, between 71b–71c and between 71e–71f are transmission devices 72a–72b, 72c–72d and 72e–72f each of which has a coding/decoding circuit (12A) based on an 8-kbps CS-ACELP high-efficiency coding scheme and the coding/decoding controller (12B) and the coding rate converter (12C) according to the present invention. These transmission devices transmit/receive control information with the exchanges 71a, 71b, 71c, 71e and 71f via transmission/switching signal links 75a–75b, 75c–75d and 75g–75h, and transfer speech signals over transmission/switching transmission lines 77a–77b, 77c–77d and 77g–77h, respectively. Thus, the exchanges 71a–71b, 71b–71c and 71e–71f are successively connected via: transmission lines 74a, 74b and 74d, respectively, which pass through the transmission devices 72a–72b, 72c–72d and 72e–72f and over which high-efficiency-coded speech signals are transferred; transmission lines 73a, 73b and 73e over which non-high-efficiency-coded speech signals are transferred; and signal links 76a, 76b and 76e. The exchanges 71c and 71d are interconnected via: a transmission line 74c which passes through transmission devices 72g and 72h and over which high-efficiency-coded speech signals are transferred; a transmission line 73c over which a non-high-efficiency-coded speech signal is transferred; and a signal link 76c. The transmission devices 72g and 72h each have a coding/decoding circuit (12A) based on a 16-kbps LD-CELP high-efficiency coding scheme and the coding/decoding controller (12B) and the coding rate converter (12C) according to the present invention, and they transmit/receive control information with the exchanges 71c and 71d via transmission-switching signal links 75e and 75f, and transfer speech signals over transmission-switching transmission lines 77e and 77f, respectively. The exchanges 71d and 71e are interconnected via a transmission line 73d, over which a non-high-efficiency-coded speech signal is transferred, and a signal link 76d. With a tandem connection of one link for coding/decoding based on the CS-ACELP high-efficieny coding scheme and one link for coding/decoding based on the LD-CELP high-efficiency coding scheme, it is understood that there is no problem in terms of speech quality. It is considered, however, that a tandem connection of more links for encoding/decoding based on the high-efficiency coding scheme will impair the speech quality. While in FIGS. 9 and 10 the signal links 75a, 75b, 75c, 75d, 75e, 75f, 75g and 75h are shown to be mounted as links independent of transmission lines 77a, 77b, 77c, 77d, 77e, 77f, 77g and 77h, they may also be mounted using specific time slots of the transmission lines 77a, 77b, 77c, 77d, 77e, 77f, 77g and 77h.

In the embodiment of FIGS. 9 and 10, upon originating a call from the telephone terminal 79a, the exchange 71a receives an analog speech signal transferred thereto over the subscriber line 78a, then judges (7d) that the transfer of a speech signal coded by the CS-ACELP high-efficiency coding scheme is possible over the immediately following transmission line 74a, then selects (7e) as an outgoing line the transmission line 74a passing through the subsequent transmission device 72a, and provides a high-efficiency-coding instruction (7j) to the coding/decoding controller (12B) of the transmission device 72a via the transmission-switching signal link 75a. Further, the exchange 71a sends to the next exchange 71b an Initial Address Message (hereinafter referred to as "IAM") 7aa indicating the start of the call. The information IAM7aa contains a coding process parameter (hereinafter referred to as "CDP-P") 7aaA newly set up for coding information including the type "CS-ACELP" of high-efficiency coding scheme for the subsequent coding and an identifier "code" indicating that the current speech signal has been coded, together with "3.1 kHZ audio" indicative of a telephone call and a Transmission Medium Requirement parameter (hereinafter referred to a "TMR-P")7aaB.

The exchange 71b analyzes the information IAM7aa received from the preceding exchange 71a, and judges (7e) that the CS-ACELP high-efficiency-coded speech signal has been transferred over the immediately preceding transmission line 74a and that the transfer of a speech signal coded with the high efficiency coding scheme identical with that used previously is possible over the immediately following transmission line 74b. Then, the exchange 71b selects (7e) as an outgoing line the transmission line 74b passing through the transmission device 72c and provides instructions (7k, 7l) via the signal links 75b and 75c to the coding/decoding controllers (12B) of the preceding and following transmission devices 72b and 72c so that they permit the passage therethrough of the speech signal without decoding/coding it. Further, the exchange 71b controls the coding rate converter (12C) of each of the transmission devices 72b and 72c to switch the speech coding rate to match it to the speed of circuit switching by the exchange 71b, and sends information IAM7ab to the next exchange 71c without adding any information to the coding-process information 7abA and without making any change in a parameter TMR-P7abB, both contained in the information IAM7ab.

The exchange 71c analyzes the information IAM7ab received from the preceding exchange 71b, and judges (7f): that the CS-ACELP high-efficiency-coded speech signal has been transferred over the immediately preceding transmission line 74b; that an LD-CELP high-efficiency coded speech signal different, in coding configuration, from that of the transmitted speech signal will be transferred over the immediately following transmission line 74c; and that the speech quality will not be degraded by non-high efficiency decoding/coding transmission between the transmission devices 72d and 72g because of alteration of the coding scheme. Then, the exchange 71c provides a decoding instruction (7m) via the transmission-switching signal link 75d to the coding/decoding controller (12B) of the preceding transmission device 72d, transfers a non-high efficiency decoded speech signal via a path between the transmission devices 72d and 72g through the exchange 71c, then selects (7f) the transmission line 74c via the transmission device 72g as an outgoing line, and provides an CD-CELP high-efficiency coding instruction (7n) via the transmission-switching signal link 75e to the coding/decoding controller (12B) of the next transmission device 72g. Further, the exchange 71c sends to the next exchange 71d information IAM7b which contains a parameter CDP-P7bA including a decoding identifier concerning the previous CS-ACELP coding scheme, the type "LD-CELP" of high-efficiency coding scheme concerning the subsequent LD-CELP high-efficiency coding scheme and an identifier "code" indicating that the speech signal has been coded, together with a parameter TMR-P7bB unmodified.

The exchange 71d analyzes the information IAM7b received from the preceding exchange 71c, and judges (7g) that the LD-CELP high-efficiency-coded speech signal has been transferred over the immediately preceding transmission line 74c and that a speech signal coded with the same high-efficiency coding system cannot be transferred over the immediately following transmission line 73d. Then, the exchange 71d provides a decoding instruction (7i) via the transmission-switching signal link 75f to the coding/decoding controller (12B) of the preceding transmission device 72h, then transfers a speech signal, decoded to a non-high-efficiency-coded form, to an outgoing line, and selects (7g) as the outgoing line the transmission line 73d which bypasses any transmission device. Further, the exchange 71d sends information IAM7ca to the next exchange 71e. The information IAM7ca contains a parameter CDP-P7caA added with a decoding identifier concerning the previous LD-CELP coding scheme, together with a TMR-P7caB unchanged.

The exchange 71e analyzes the information IAM7ca received from the preceding exchange 71d, and judges (7h) that a high-efficiency-coded speech signal has not been transferred over the immediately preceding transmission line 73d and that the transfer of CS-ACELP high-efficiency-coded speech is impossible over the immediately following transmission line 74d because of specifications previous high-efficiency coding scheme although it is an option to transfer a CS-ACELP high-efficiency-coded speech signal. Then, the exchange 71e transfers non-high-efficiency-coded speech signal to an outgoing line and selects (7h) the transmission line 73e bypassing the transmission devices 72e and 72f, thereafter sending information IAM7cb to the next exchange 71f without adding any information to coding-process information 7cbA and without making any change in a parameter TMR-P7cbB, both contained in the information IAM7cb. The terminating exchange 71f indicates the incoming call to the terminating telephone terminal 79b, to which an analog speech signal is transferred over the subscriber line 78b.

Figure 11:
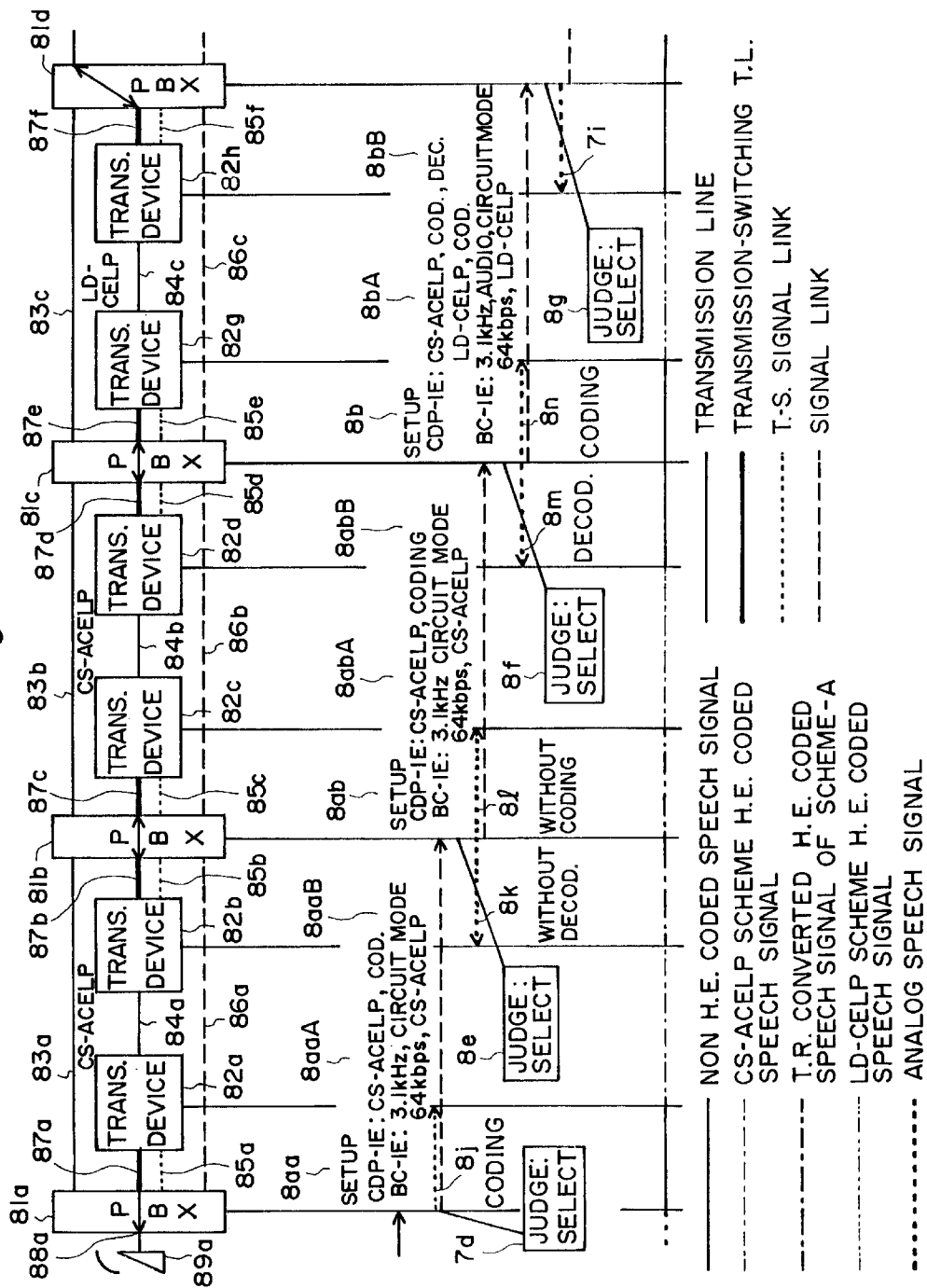
FIG. 11 is a block diagram illustrating another embodiment of the present invention which uses, as an out-band signaling system between MPBXs, an ISDN user•network interface signaling system defined in ITU-T Recommendation Q.931 or ISO Standard 11572.
Figure 12:
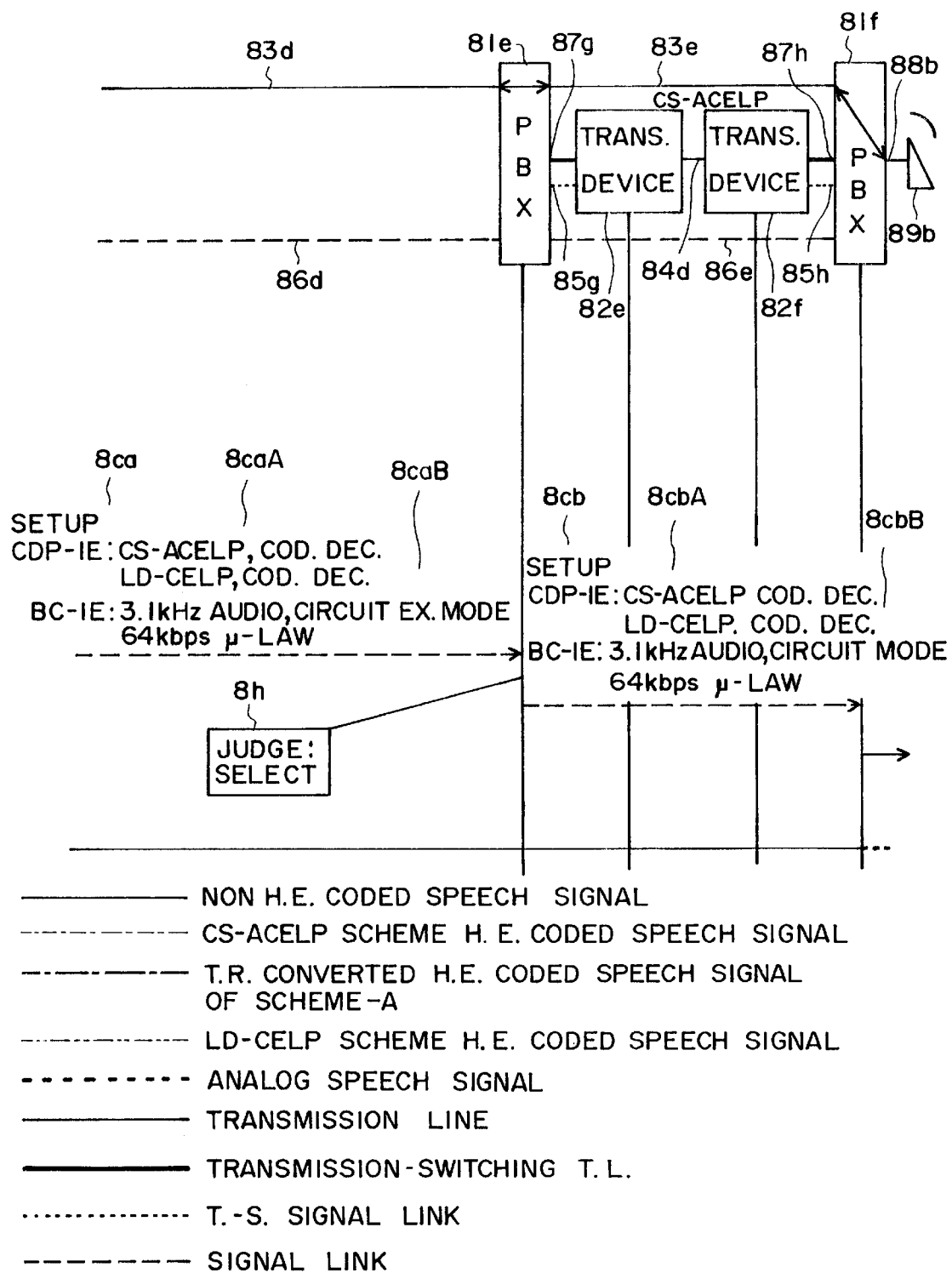
FIG. 12 is a block diagram illustrating, in combination with FIG. 11, the embodiment of the present invention which uses, as the out-band signaling system between PBXs, the ISDN user•network interface signaling system defined in ITU-T Recommendation Q.931 or ISO Standard 11572.

FIGS. 11 and 12 are diagrams depicting, in two parts, an example which uses, as an out-band signaling system between PBXs, an ISDN user•network interface signaling system (hereinafter referred to as "DSS1") defined in ITU-T Recommendation Q.931 or ISO Standard 11572. Originating and terminating telephone terminals 89a and 89b are connected to originating and terminating PBXs 81a and 81f via analog subscriber lines 88a and 88b, respectively. Interposed between PBXs 81a–81b, between 81b–81c and between 81e–81f are transmission devices 82a–82b, 82c–82d and 82e–82f each of which has an encoding/decoding circuit (12A) based on an 8-kbps CS-ACELP high-efficiency coding scheme and the coding/decoding controller (12B) and the coding rate converter (12C) according to the present invention. These transmission devices swap control information with the PBXs 81a, 81b, 81c, 81e and 81f via transmission-switching signal links 85a,85b, 85c, 85d, 85g and 85h and transfer speech signals over transmission-switching transmission lines 87a–87b, 87c–87d and 87g–87h, respectively. Thus, the PBXs 81a–81b, 81b–81c and 81e–81f are respectively connected via: transmission lines 84a, 84b and 84d which pass through the transmission devices 82a–82b, 82c–82d and 82e–82f and over which high-efficiency-coded speech signals are transferred; transmission lines 83a, 83b and 83e over which non-high-efficiency-coded speech signals are transferred; and signal links 86a, 86b and 86e. The PBXs 81c and 81d are mutually connected via: a transmission line 84c which passes through transmission devices 82g and 82h and over which a high-efficiency-coded speech signal is transferred; a transmission line 83c over which a non-high-efficiency-coded speech signal is transferred; and a signal link 86c. The transmission devices 82g and 82h each have the coding/decoding circuit (12A) based on a 16-kbps LD-CELP high-efficiency coding scheme and the coding/decoding controller (12B) and the coding rate converter (12C) according to the present invention, and they transmit/receive control information with the PBXs 81c and 81d via transmission-switching signal links 85e and 85f and transfer speech signals over transmission-switching transmission lines 87e and 87f, respectively. The PBXs 81d and 81e are interconnected via a transmission line 83d over which a non-high-efficiency-coded speech signal is transferred, and a signal link 86d. With a tandem connection of one link for coding/decoding based on the CS-ACELP high-efficiency coding scheme and one link for coding/decoding based on the LD-CELP high-efficiency coding scheme, it is understood that there is no problem in terms of speech quality. It is considered, however, that a tandem connection of more links for coding/decoding based on the high-efficiency coding scheme will degrade the speech quality. While in FIGS. 11 and 12 the signal links 85a, 85b, 85c, 85d, 85e, 85f, 85g and 85h are shown to be mounted as links independent of transmission lines 87a, 87b, 87c, 87d, 87e, 87f, 87g and 87h, they may also be mounted using specific time slots of the transmission lines 87a, 87b, 87c, 87d , 87e, 87f, 87g and 87h.

In FIGS. 11 and 12, upon originating a call from the telephone terminal 89a, the PBX 81a: receives an analog speech signal transferred thereto over the subscriber line 88a; judges (8d) that transfer of a CS-ACELP high-efficiency coded speech signal is possible over the immediately following transmission line 84a; selects (8e) as an outgoing line the transmission line 84a passing through the subsequent transmission device 82a; and provides a high-efficiency-coding instruction (8j) to the coding/decoding controller (12B) of the transmission device 82a via the trtansmission-switching signal link 85a.

Further, the PBX 81a sends to the next PBX 81b a SET-UP message (hereinafter referred to as "SETUP") 8aa indicating the start of a call.

The information SETUP8aa contains a coding-process information element (hereinafter referred to as "CDP-IE") 8aaA newly set up for coding-process information composed of the type "CS-ACELP" of high-efficiency coding scheme for the subsequent coding scheme and an identifier "code" indicating that the current speech signal has been coded, and a bearer capability information element (hereinafter referred to as "BC-IE"), which is composed of an information transfer capability set-up at "3.1 kHZ audio" for indicating the telephone call, a transfer mode set-up at "circuit mode," an information transfer rate set-up at "64 kbps" and information "CS-ACELP" which newly defines a user information layer 1 protocol.

The PBX 81b analyzes the information SETUP8aa received from the preceding PBX 81a, and judges (8e) that the CS-ACELP high-efficiency-coded speech signal has been transferred over the immediately preceding transmission line 84a and that a speech signal coded with the high efficiency coding scheme identical with that used previously can be transferred over the immediately following transmission line 84b. Then, the PBX 81b selects (8e) as an outgoing line the transmission line 84b passing through the transmission device 82c and provides instructions (8k, 8l) via the signal links 85b and 85c to the coding/decoding controllers (12B) of the preceding and following transmission devices 82b and 82c connected to the transmission line 84b so that they permit the passage therethrough of the speech signal without decoding/coding it. Further, the PBX 81b controls the coding rate converter (12C) of each of the transmission devices 82b and 82c to convert the speech coding rate to match it to the signal transmission rate in the PBX 81b, and sends information SETUP8ab to the next PBX 81c without adding any information to or modifying coding information 8abA and 8abB contained in the information SETUP8ab.

The PBX 81c analyzes the information SETUP8ab received from the preceding PBX 81b, and judges (8f): that the CS-ACELP high-efficiency-coded speech signal has been transferred over the immediately preceding transmission line 84b; that a speech signal coded by an LD-CELP high-efficiency-coding scheme will be transferred over the immediately following transmission line 84c; and that the speech quality will not be degraded by non-high quality decoding/coding transmission between the transmission devices 82d and 82g because of alteration of the coding scheme. Then, the PBX 81c provides a decoding instruction (8m) via the transmission-switching signal link 85d to the coding/decoding controller (12B) of the preceding transmission device 82d, then transfers a non-high efficiency decoded speech signal via a path between the transmission devices 82d and 82g through the exchange 81c, then selects (8f) by the PBX 81c the transmission line 84c via the transmission device 82g as an outgoing line, and provides a LD-CELP high-efficiency coding instruction (8n) via the transmission-switching signal link 85e to the coding/decoding controller (12B) of the next transmission device 82g. Further, the PBX 81c sends to the next PBX 81d information SETUP8b which contains a coding-process information element CDP-IE8bA including a decoding identifier concerning the previous CS-ACELP coding scheme, the type "LD-CELP" of high-efficiency coding scheme concerning the subsequent LD-CELP high-efficiency coding scheme and an identifier "code" indicating that the speech signal has been coded, and a beaer capability information element BC-IE8bB having modified the user information layer 1 protocol to "LD-CELP" newly defied.

The PBX 81d analyzes the information SETUP8b received from the preceding PBX 81c, and judges (8g) that the LD-CELP high-efficiency-coded speech signal has been transferred over the immediately preceding transmission line 84c and that a speech signal coded with the same high-efficiency coding scheme cannot be transferred over the immediately following transmission line 83d. Then, the PBX 81d provides: a decoding instruction (8i) via the transmission-switching signal link 85f to the coding/decoding controller (12B) of the preceding transmission device 82h; transfers a speech signal, decoded to a non-high-efficiency-coded form, to an outgoing line; and selects (8g) as the outgoing line the transmission line 83d which bypasses the transmission device. Further, the PBX 81d sends information SETUP8ca to the next PBX 81e. The information SETUP8ca contains an information element CDP-IE8caA added with a decoding identifier concerning the previous LD-CELP coding scheme, together with an information element BC-IEcaB having modified the user information layer 1 protocol to "µ-law" or "A-law"

The PBX 81e analyzes the information SETUP8ca received from the preceding PBX 81d, and judges (8h) that a high-efficiency-coded speech signal has not been transferred over the immediately preceding transmission line 83d and that the transfer of CS-ACELP high-efficiency-coded speech signal is impossible over the immediately following transmission line 84d because of specification of previous high-efficiency coding scheme although it is an option to transfer a CS-ACELP high-efficiency-coded speech signal. Then, the PBX 81e transfers non-high-efficiency-coded speech to an outgoing line, and selects (8h) the transmission line 83e which bypasses the transmission devices 82e and 82f, thereafter sending information SETUP8cb to the next PBX 81f without adding any information to coding-process information 8cbA and without making any change in an information element BC-IE8cbB, both contained in the information SETUP8cb. The terminating PBX 81f indicates the incoming call to the terminating telephone terminal 89b, to which an analog speech signal is transferred over the subscriber line 88b.

Figure 13:
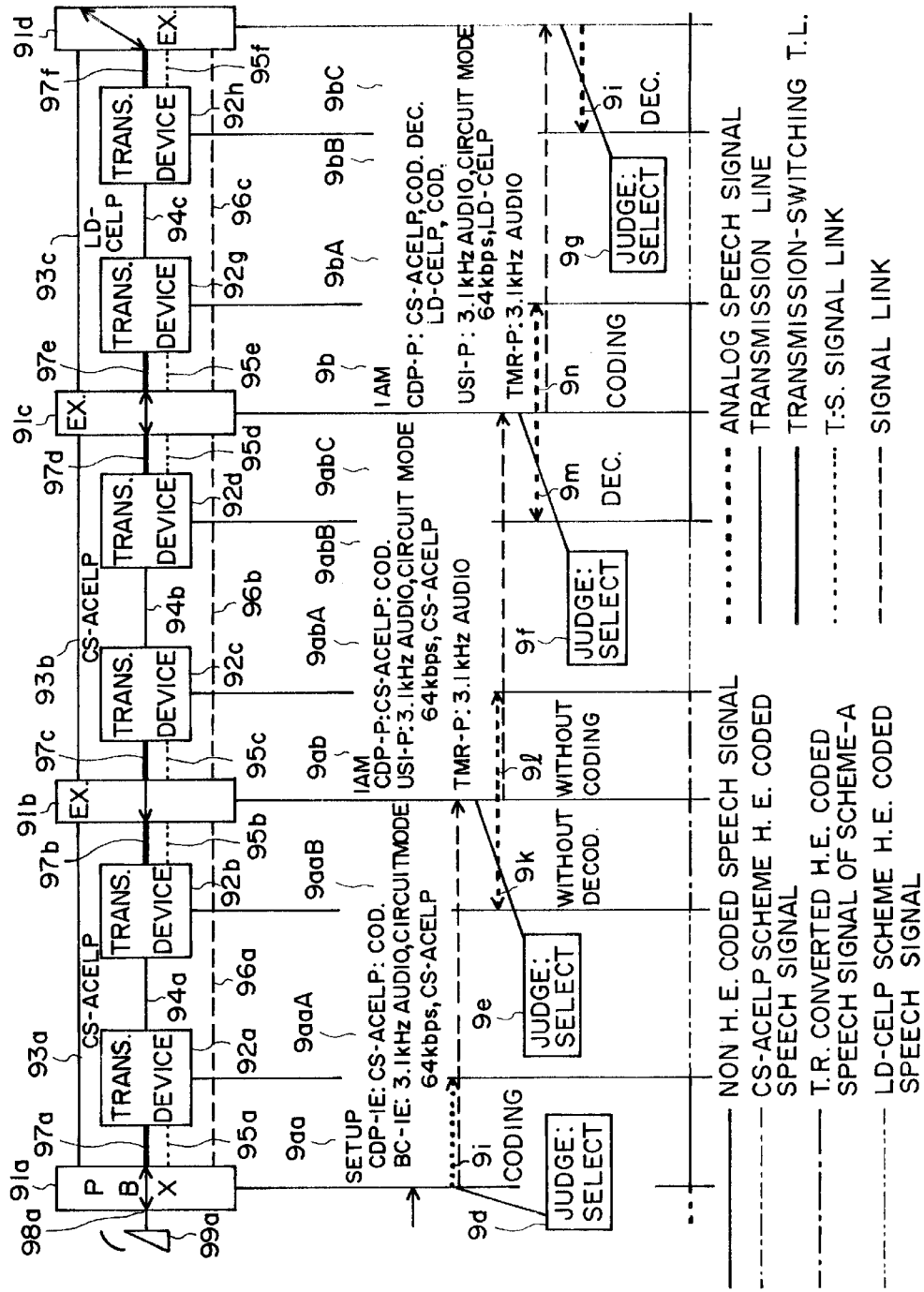
FIG. 13 is a block diagram illustrating another embodiment of the present invention which uses, as the out-band signaling system between exchanges, the No. 7 signaling system ISDN user part defined in ITU-T Recommendations Q.931 and Q.764 and, as an out-band signaling system for a subscriber line, the ISDN•network interface signaling system defined in ITU-T Recommendation Q.931.
Figure 14:
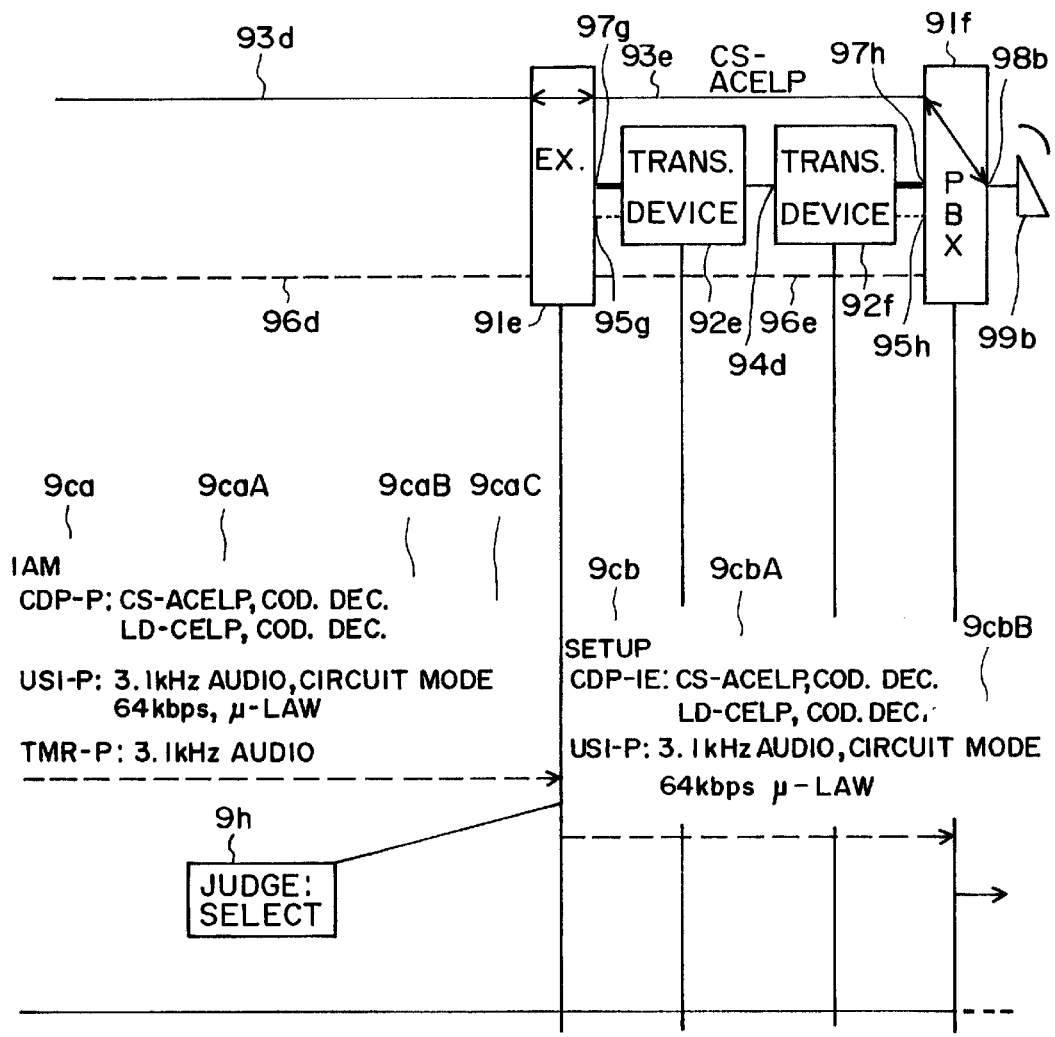
FIG. 14 is a block diagram illustrating, in combination with FIG. 13, the embodiment of the present invention which uses, as the out-band signaling system between exchanges, the No. 7 signaling system ISDN user part defined in ITU-T Recommendations Q.763 and Q.764 and, as the out-band signaling system for a subscriber line, the ISDN•network interface signaling system defined in ITU-T Recommendation Q.931.
Figure 15:
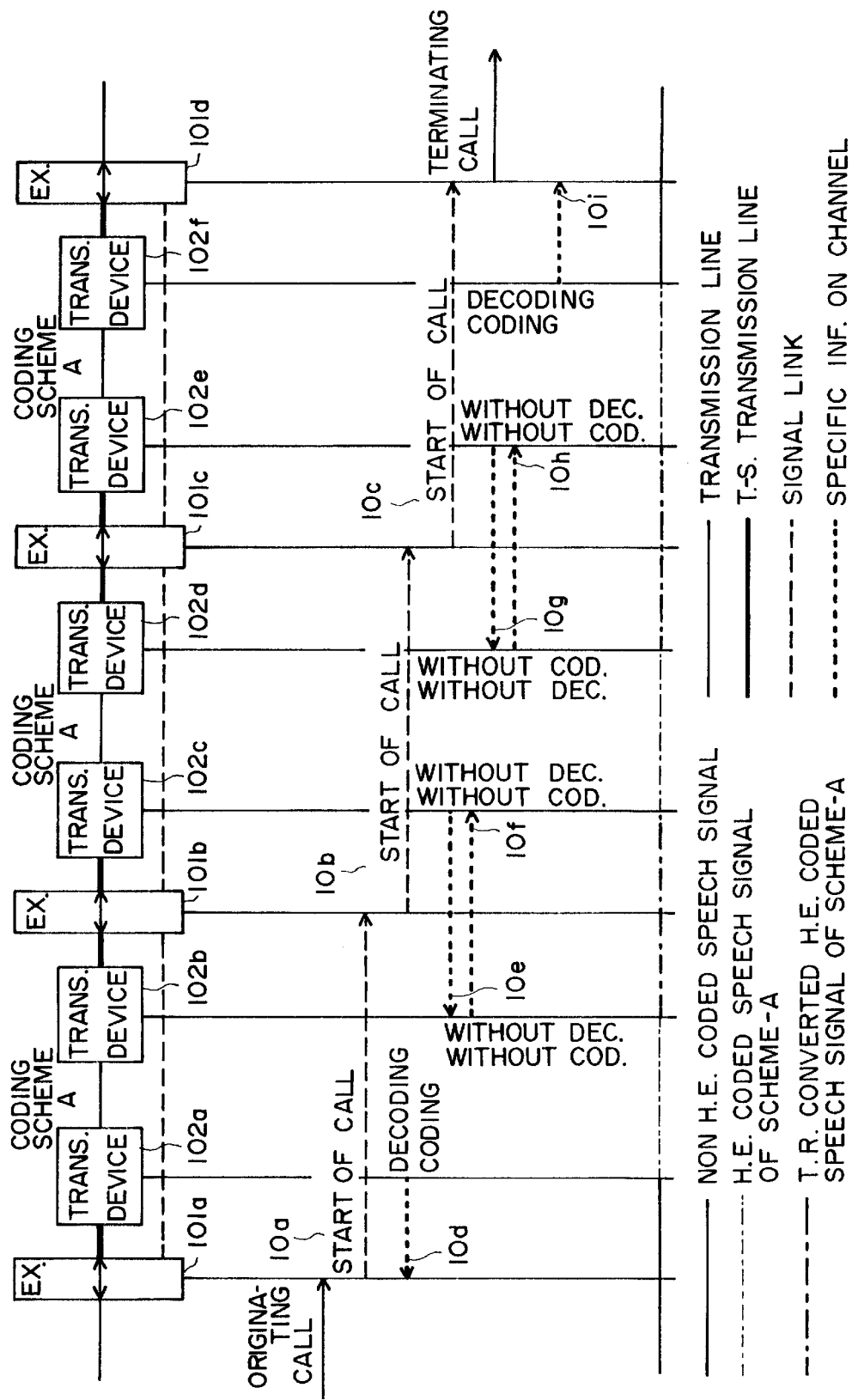
FIG. 15 is a block diagram showing a conventional transmission device connection control system.
Figure 16:
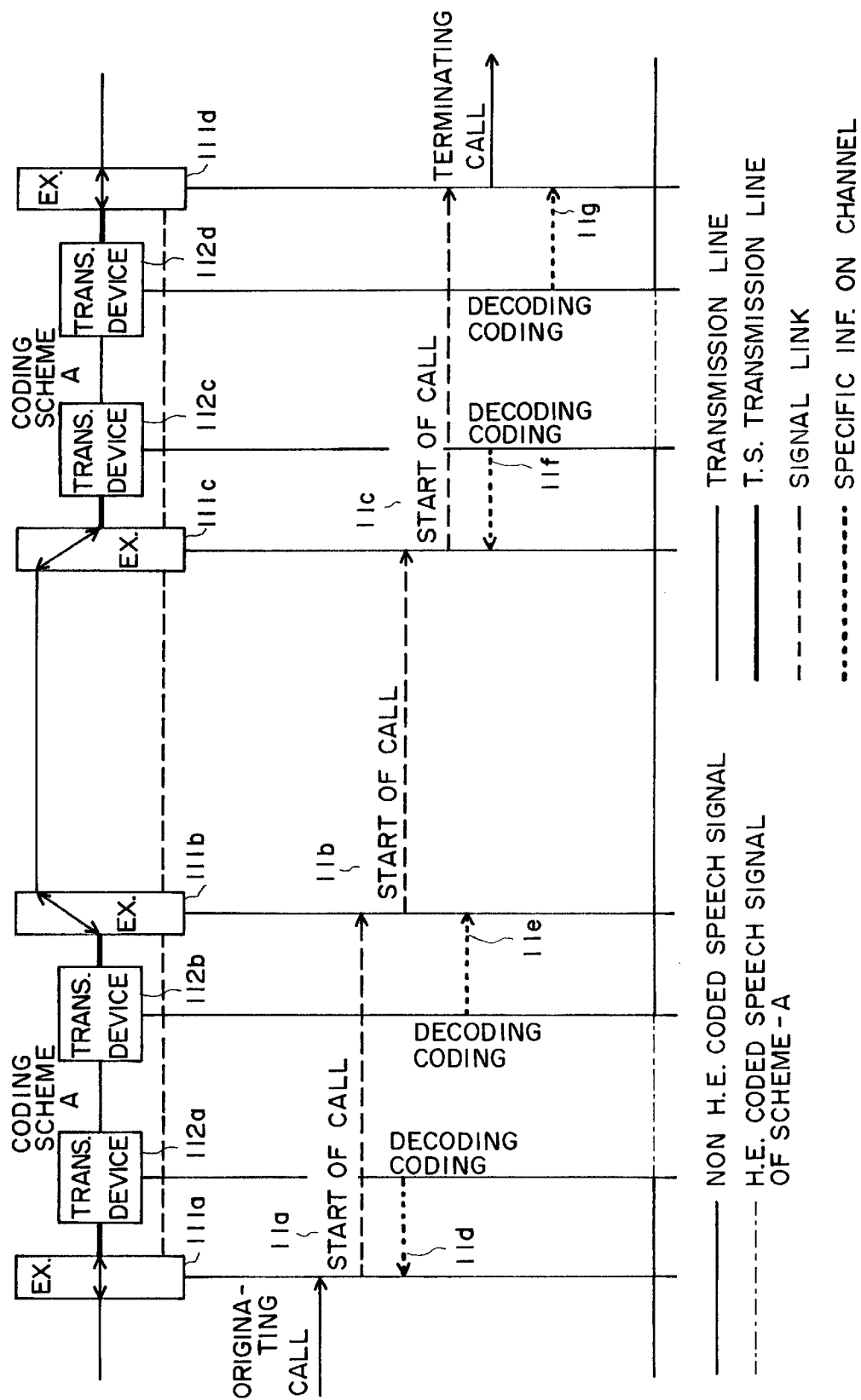
FIG. 16 is a block diagram explanatory of problems encountered in the conventional transmission device connection control system.
Figure 17:
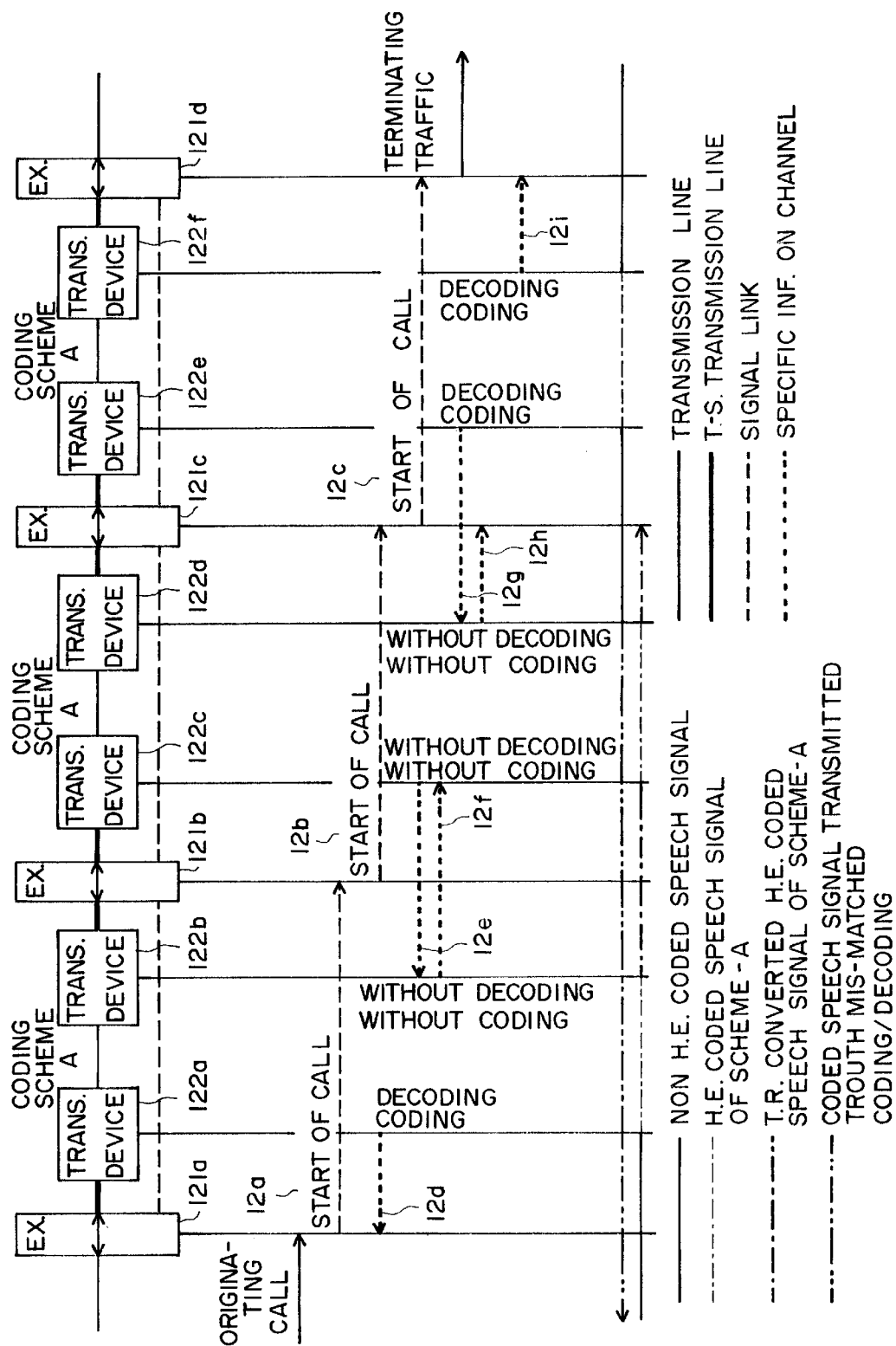
FIG. 17 is a block diagram explanatory of other problems encountered in the conventional transmission device connection control system.

FIGS. 13 and 14 are diagrams depicting, in two parts, an example which uses, as an out-band signaling system between exchanges, No. 7 signaling system ISDN user part (hereinafter referred to as "N7ISUP") defined in ITU-T Recommendations Q.763 and Q.764. Originating and terminating telephone terminals 99a and 99b are connected to originating and terminating PBXs 91a and 91f via analog subscriber lines 98a and 98b, respectively. Interposed between the PBX 91a and an exchange 91b, between exchanges 91b and 91c and between an exchange 91e and the PBX 91f, respectively, are transmission devices 92a–92b, 92c–92d and 92e–92f which have a coding/decoding circuit (12A) based on an 8-kbps CS-ACELP high-efficiency coding scheme and the coding/decoding controller (12B) and the speech coding rate converter (12C) according to the present invention. These transmission devices transmit/receive control information with the PBX 91a and the exchanges 91b, 91c, 91e and 91f via transmission-switching signal links 95a, 95b, 95c, 95d, 95g, 95h, and transfer speech over transmission-switching transmission lines 97a, 97b, 97c, 97d, 97g, 97h, respectively. Thus, the PBX 91a and the exchange 91b, the exchanges 91b and 91c, the exchange 91e and the PBX 91f are respectively connected via: transmission lines 94a, 94b and 94d which pass through the transmission devices 92a–92b, 92c–92d and 92e–92f and over which high-efficiency-coded speech signals are transferred; transmission lines 93a, 93b and 93e over which non-high-efficiency-coded speech signals are transferred; and signal links 96a, 96b and 96e.

Similarly, the exchanges 91c and 91d are mutually connected via: a transmission line 94c which passes through transmission devices 92g and 92h and over which high-efficiency-coded speech signals are transferred; a transmission line 93c over which a non-high-efficiency-coded speech signal is transferred; and a signal link 96c. The transmission devices 92g and 92h also have a coding/decoding circuit (12A) based on the 16-kbps LD-CELP high-efficiency coding scheme and the coding/decoding controller (12B) and the speech coding rate converter (12C) according to the present invention, and they transmit/receive control information with the exchanges 91c and 91d via transmission-switching signal links 95e and 95f and transfer speech signals over transmission-switching transmission lines 97e and 97f, respectively. The exchanges 91d and 91e are interconnected via a transmission line 93d, over which a non-high-efficiency-coded speech signal is transferred and a signal link 96d. With a tandem connection of one link for coding/decoding based on the CS-ACELP high-efficiency coding scheme and one link for coding/decoding based on the LD-CELP high-efficiency coding scheme, it is understood that there is no problem in terms of speech quality. It is considered, however, that a tandem connection of more links for coding/decoding based on the high-efficiency coding scheme will degrade the speech quality. While in FIGS. 13 and 14 the signal links 95a, 95b, 95c, 95d, 95e, 95f, 95g and 95h are shown to be mounted as links independent of transmission lines 97a, 97b, 97c, 97d, 97e, 97f, 97g and 97h, they may also be mounted using specific time slots of the transmission lines 97a, 97b, 97c, 97d, 97e, 97f, 97g and 97h. The transmission lines 93a and 94a and the signal link 96a, and the transmission line 93e and 94d and the signal link 96e constitute ISDN subscriber lines, respectively.

In FIGS. 13 and 14, upon originating a call from the telephone terminal 99a, the PBX 91a: receives an analog speech signal transferred thereto over the subscriber line 98a; judges (9d) that the transfer of a CS-ACELP high-efficiency coded speech signal is possible over the immediately following transmission line 94a; selects (9e) as an outgoing line the transmission line 94a passing through the subsequent transmission device 92a; and provides a high-efficiency-coding instruction (9j) to the coding/decoding controller (12B) of the transmission device 92a via the transmission-switching signal link 95a. Further, the PBX 91a sends to the next-stage exchange 91b a SET-UP message (hereinafter referred to as "SETUP") 9aa indicating the start of the call. The information SETUP9aa contains a coding-process information element (hereinafter referred to as "CDP-IE") 9aaA newly set up for coding-process information composed of the type "CS-ACELF" of high-efficiency coding scheme for the subsequent coding system and an identifier "code" indicating that the current speech signal has been coded, and a bearer capacity information element (hereinafter referred to as "BC-IE") 9aaB which is composed of an information transfer capability set-up at "3.1 kHZ audio" for indicating the telephone call, a transfer mode set-up at "circuit mode," an information transfer rate set-up at "64 kbps" and information "CS-ACELP" which newly defines a user information layer 1 protocol.

The exchange 91b analyzes the information SETUP9aa received from the preceding PBX 91a, and judges (9e) that the CS-ACELP high-efficiency-coded speech signal has been transferred over the immediately preceding transmission line 94a and that the transfer of a speech signal coded with the high efficiency coding scheme identical with that used previously is possible over the immediately following transmission line 94b. Then, the exchange 91b selects (9e), as an outgoing line, the transmission line 94b passing through the transmission device 92c, and provides instructions (9k, 9l) via the signal links 95b and 95c to the coding/decoding controllers (12B) of the preceding and following transmission devices 92b and 92c connected to the selected transmission line 94b so that they permit the passage therethrough of the speech signal without decoding/coding it. Further, the exchange 91b controls the coding rate converter (12C) of each of the transmission devices 92b and 92c to convert the speech coding rate to match it to the signal transmission rate in the exchange 91b. Following this, the exchange 91b maps information contained in CDPIE9aaA in SETUP9aa on CDP-P9abA newly set up in IAM9ab and information contained in BC-IE9aaB in SETUP9aa on a user service information parameter (hereinafter referred to as "USI-P") 9abB, thereafter sends to the next exchange 91c the information IAM9ab containing TMR-P9abC set-up as "3.1 kHz audio," together with the mapped information.

The exchange 91c analyzes the information IAM9ab received from the preceding exchange 91b, and judges (9f) that a CS-ACELP high-efficiency-coded speech signal has been transferred over the immediately preceding transmission line 94b, that a speech signal coded by the LD-CELP high-efficiency coding scheme will be transferred over the immediately following transmission line 94c, and that the speech quality will not be degraded by non-high efficiency decoding/coding transmission between transmission devices 92d and 92g because of alteration of the coding scheme. Then, the exchange 91c: provides a decoding instruction (9m) via the transmission-switching signal link 95d to the coding/decoding controller (12B) of the preceding transmission device 92d; transfers a non-high efficiency decoded speech signal via a path between the transmission devices 92d and 92g through the exchange 91c; then selects (9f), as an outgoing line, the transmission line 94c passing through the transmission device 92g; and provides an CD-CELP high-efficiency coding instruction (9n) via the transmission-switching signal link 95e to the coding/decoding controller (12B) of the next transmission device 92g. Further, the exchange 91c sends to the next exchange 91d information IAM9b which contains: CDP-F9bA including a decoding identifier concerning the previous CS-ACELP coding scheme, the type "LD-CELP" of high-efficiency coding scheme concerning the subsequent LD-CELP high-efficiency coding scheme and an identifier "code" indicating that the speech signal has been coded; USI-P9bB having modified the user information layer 1 protocol to newly set-up "LD-CELP"; and TMR-P9bC held unchanged.

The exchange 91d analyzes the information IAM9b received from the preceding exchange 91c, and judges (9g) that the LD-CELP high-efficiency-coded speech signal has been transferred over the immediately preceding transmission line 94c and that a speech signal coded with the same high-efficiency coding scheme cannot be transferred over the immediately following transmission line 93d. Then, the exchange 91d: provides a decoding instruction (9i) via the transmission-switching signal link 95f to the coding/decoding controller (12B) of the preceding transmission device 92h; transfers a speech signal, decoded to a non-high-efficiency-coded form, to an outgoing line; and selects (9g) as the outgoing line the transmission line 93d which bypasses the transmission device. Further, the exchange 91d sends information IAM9ca to the next exchange 91e. The information IAM9ca contains: CDPP9caA added with a decoding identifier concerning the previous LD-CELP coding scheme; USI-P9caB having modified the user information layer 1 protocol to "μ-law" or "A-law"; and TMR-P9caC remaining unchanged.

The exchange 91e analyzes the information IAM9ca received from the preceding exchange 91d, and judges (9h) that a high-efficiency-coded speech signal has not been transferred over the immediately preceding transmission line 93d and that the transfer of a CS-ACELP high-efficiency-coded speech signal is impossible over the immediately following transmission line 94d because of specification of previous high-efficiency coding scheme although it is an option to transfer a CS-ACELP high-efficiency-coded speech signal. Then, the exchange 91e transfers non-high-efficiency-coded speech to an outgoing line, and selects (9h) the transmission line 93e which bypasses the transmission devices 92e and 92f. Following this, the exchange 91e maps coding-process information 9caA and USI-PcaB in IAM9ca intact on CDP-IE9cbA and BC-IE9cbB in SETUP9cb, thereafter sending the information SETUP9cb to the subsequent PBX 91f.

The terminating PBX 91f indicates the incoming call to the terminating telephone terminal 99b, to which an analog speech signal is transferred over the subscriber line 98b.

In the PBX 91f, the coding information sent thereto can be used to establish a routing between other PBXs to transfer therebetween a call.

The present invention may also be carried out using DDS2 or a BI-SDN user part of No. 7 signaling system which are wide-band ISDN (hereinafter referred to "B-ISDN") signaling systems and defined in ITU-T Recommendations Q.2931 or Q.2763 and Q.2764.

As described above in detail, according to the first invention of this application, information on a high-efficiency speech coding scheme used in the previous transmission line is sent to the following exchange through the use of an out-band signaling system and the exchange uses the information to select an outgoing transmission line.

This avoids multi-stage coding/decoding of a high-efficiency-coded speech signal and hence prevents degradation of speech quality and ensures an efficient speech signal transfer. Furthermore, even in a case where identical transmission devices or the same high-efficiency coding scheme cannot be used over the entire channel, it is possible to avoid degradation of speech quality and perform an efficient speech signal transfer.

According to the second invention of this application, decoding/coding of a high-efficiency-coded speech signal in a transmission device connected to an exchange is performed or avoided in response to an instruction from that exchange. By this, multi-stage coding/decoding of the high-efficiency-coded speech signal is avoided, preventing degradation of speech quality and ensuring an efficient speech signal transfer in more cases. Furthermore, even when identical transmission devices or the same high-efficiency coding system cannot be used over the entire channel, it is possible to avoid degradation of speech quality and perform an efficient speech signal transfer in more cases. Moreover, since setting of transmission devices for communication has been already completed when a call starting signal is transferred over the entire channel, it is possible to solve a problem that a speech signal or acoustic signal cannot be transferred before the called party answers.

What I claim is:

1. A control system for transmission devices each equipped with a high-efficiency coding scheme in a communication network in which a first transmission line through each of said transmission devices provided with a coding/decoding circuit for high-efficiency coding/deoding of an acoustic signal and a second transmission line not through said each transmission device are connected to one of a predetermined number of exchanges, CHARACTERIZED IN:

that, in the case of starting the terminating of a transfer operation of a high-efficiency-coded acoustic signal from one of said predetermined number of exchanges, a type of high-efficiency coding scheme to be used and an identifier, which indicates that said acoustic signal has been coded or decoded by said high-efficiency coding scheme, are sent as processing information on said coded acoustic signal which is transferred from said one of said exchanges to a following exchange in said communication network, said processing information being contained in a call control signal indicative of a start of a call; and that each of said exchanges in said communication network, through which said coded acoustic signal passes in said transfer operation, uses said processing information transferred thereto to select said first transmission line or said second transmission line as an outgoing line so as to avoid degradation of the quality of said acoustic signal due to multi-stage coding and decoding for said high-efficiency coding scheme and to efficiently transfer said acoustic signal.

2. A transmission device control system in a communication network according to claim 1, characterized in that said one of said exchanges is provided with a call controller for effecting a call control operation by a processing function of an out-band signaling system and a switching circuit for circuit switching, said call controller of said one of said exchanges being connected to said transmission device via a transmission switching signal link.

3. A transmission device control system in a communication system according to claim 1, characterized in that said transmission device is provided with a coding/decoding controller, which, based on said processing information, controls whether to enable a high-efficiency coding/decoding scheme of said acoustic signal or to disable the high-efficiency coding/decoding in said transmission device, and a coding rate converter for converting a coding rate of said coded acoustic signal, said coding/decoding controller of said transmission device being connected to a call controller of said one of said exchanges via a transmission switching signal link.

4. A transmission device control system in a communication network according to claim 3, characterized in that: said processing information is analyzed in said call controller of said one of said exchanges; and when the transfer of an acoustic signal coded with the same high-efficiency coding scheme as the high-efficiency coding scheme of said first transmission line immediately preceding said one of said exchanges is possible over said first transmission line immediately following said one of said exchanges, said one of said exchanges selects as an outgoing line said first transmission line through said transmission device and provides an instruction via said transmission switching signal link to said coding/decoding controller of each of said transmission devices preceding and following said one of said exchanges connected thereto so that said one of said exchanges permits the passage therethrough of said coded acoustic signal intact without coding or decoding the same, and provides onto said immediately a coding rate of said coded acoustic signal in said coding rate converter.

5. A transmission device control system in a communication network according to claim 3, characterized in that: said processing information is analyzed in said call controller of said one of said exchanges; and when the transfer of an acoustic signal coded with the same high-efficiency coding scheme as the high-efficiency coding scheme of said first transmission line immediately preceding said one of said exchanges is impossible over said first transmission line immediately following said one of said exchanges, said one of said exchanges selects as an outgoing line said second transmission line not through said transmission device and provides an instruction via said transmission switching signal link to said coding/decoding controller of said transmission device preceding said one of said exchanges so that said transmission device decodes said coded acoustic signal, and provides onto said immediately following second transmission line said signal decoded to an acoustic signal of non-high-efficiency coding scheme.

6. A transmission device control system in a communication network according to claim 3, characterized in that: said processing information is analyzed in said call controller of said one of said exchanges; when it is judged that the transfer of an acoustic signal coded with a second high-efficiency coding scheme different from said high-efficiency coding scheme is possible over said first transmission line immediately following said one of said exchanges, and that degradation of the quality of said coded acoustic signal will be avoided in a coding step by said second high-efficiency coding scheme, said one of said exchanges: selects as an outgoing line said first transmission line through said transmission device: provides an instruction via said transmission switching signal link to said coding/decoding controller of said transmission device preceding said one of said exchanges so that said transmission device decodes said coded acoustic signal: provides an instruction via said transmission switching signal link to said decoding/coding controller of said transmission device following said one of said exchanges so that said transmission device encodes said acoustic signal by said second high-efficiency coding scheme; and transfer to said immediately following first transmission line a signal obtained by said second high-efficiency coding scheme.

* * * * *